(12) United States Patent
Okuwaki et al.

(10) Patent No.: US 8,490,000 B2
(45) Date of Patent: Jul. 16, 2013

(54) PROGRAM, METHOD AND SYSTEM FOR SELECTING THE THREE-DIMENSIONAL MODEL OF A COMPONENT

(75) Inventors: Yoshihito Okuwaki, Kawasaki (JP); Yoshikazu Katou, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 783 days.

(21) Appl. No.: 12/038,286

(22) Filed: Feb. 27, 2008

(65) Prior Publication Data

US 2008/0222568 A1 Sep. 11, 2008

(30) Foreign Application Priority Data

Mar. 8, 2007 (JP) .................................. 2007-059274

(51) Int. Cl.
*G06F 3/14* (2006.01)
*G06F 3/17* (2006.01)

(52) U.S. Cl.
USPC ................... 715/752; 715/753; 703/1; 703/6; 463/39; 345/420

(58) Field of Classification Search
USPC .......... 715/200–277, 700–867; 700/701–866; 709/201–229; 705/50–79; 703/1, 6; 707/1–10, 707/100–104.1, 200–206; 463/39; 345/30–111, 345/420

See application file for complete search history.

(56) References Cited

U.S. PATENT DOCUMENTS

| 5,634,016 | A | * | 5/1997 | Steadham et al. | ............. 715/753 |
| 5,689,435 | A | * | 11/1997 | Umney et al. | ..................... 703/1 |
| 7,574,337 | B2 | * | 8/2009 | Kropaczek et al. | ................ 703/6 |
| 7,864,173 | B2 | * | 1/2011 | Handley et al. | ............... 345/420 |
| 2003/0063103 | A1 | | 4/2003 | Shiroyama et al. | |
| 2008/0300055 | A1 | * | 12/2008 | Lutnick et al. | .................. 463/39 |

FOREIGN PATENT DOCUMENTS

| CN | 1214133 A | 4/1999 |
| JP | 10-260982 A | 9/1998 |
| JP | 2001-196720 | 7/2001 |
| JP | 2003-108603 A | 4/2003 |
| JP | 2006-59006 | 3/2006 |
| WO | 97/27554 | 7/1997 |

OTHER PUBLICATIONS

Chinese Office Action issued Jan. 8, 2010 in corresponding Chinese Patent Application 200810083471.8.
English-language Abstract & Partial English-language Translation of JP-2001-196720.
Japanese Office Action mailed on Dec. 27, 2011, for corresponding Japanese Application No. 2007-059274, with Partial English-language Translation.

* cited by examiner

*Primary Examiner* — Ruay Ho
(74) *Attorney, Agent, or Firm* — Fujitsu Patent Center

(57) ABSTRACT

A computer functioning as three-dimensional (3D) computer aided design (3D-CAD) system executes the process for selecting a 3D model of a component from a library. The process includes a step for designating a category of a component; a step for displaying a menu for designating values of category-dependent items representing a specification of the component; a step for narrowing down, on the basis of the designated value, records of a database, in which each record for each component includes the items representing the specification; a step for extracting a possible value of an item with its value being undetermined and accordingly updating a choice(s) selectable via the menu; and a step for determining, to be a 3D model to be loaded from the library, the 3D model of the component uniquely determined after repeating the above-mentioned steps for narrowing-down, extracting and updating for one time or more.

17 Claims, 18 Drawing Sheets

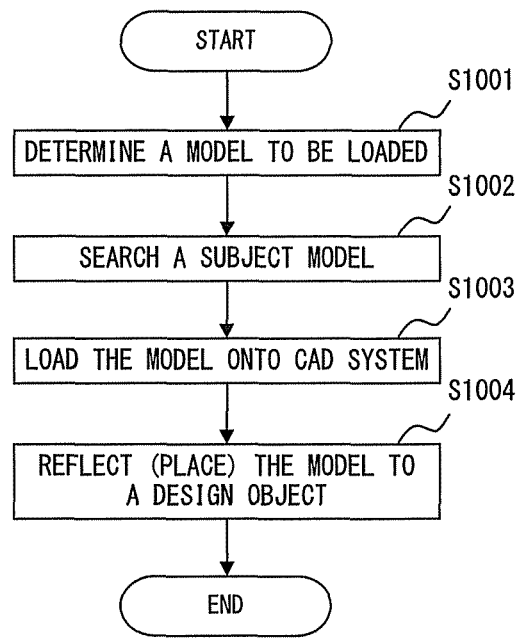
F I G. 2

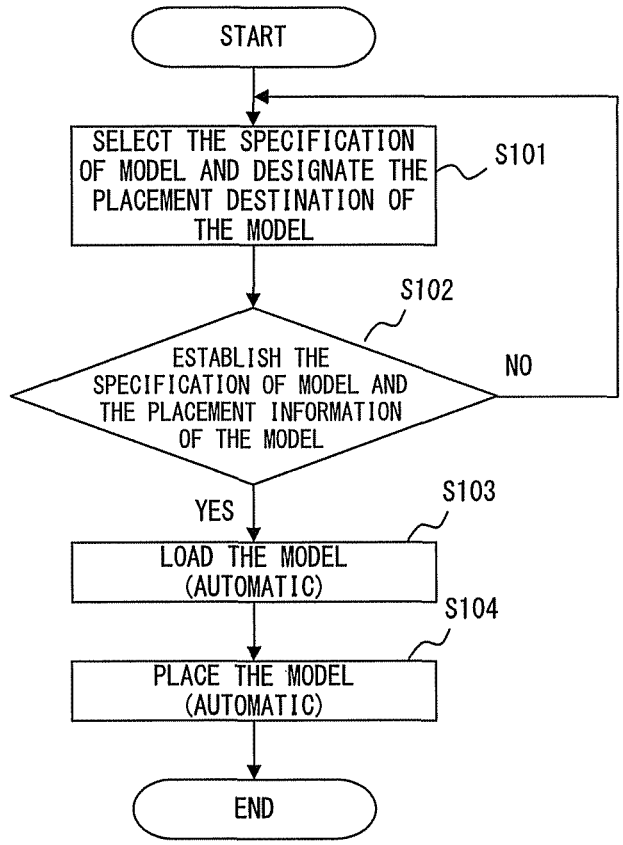
F I G. 5

| DRAWING NUMBER | SCREW OR BOLT SPECIFICATION | | | | SCREW OR BOLT PLACEMENT DESTINATION CONDITION | | |
|---|---|---|---|---|---|---|---|
| | SCREW OR BOLT CATEGORY | MATERIAL | SCREW DIAMETER | SCREW LENGTH | TAPPED HOLE DIAMETER | CLEARANCE HOLE DIAMETER | MINIMUM FASTENING PLATE THICKNESS |
| SNA2-06STEEL | PAN HEAD MACHINE SCREW | STEEL | M2 | 6 | 2.0 | 2.5 | 0.4 |
| SNA2-08STEEL | PAN HEAD MACHINE SCREW | STEEL | M2 | 8 | 2.0 | 2.5 | 0.6 |
| SNA3-06STEEL | PAN HEAD MACHINE SCREW | STEEL | M3 | 6 | 3.0 | 3.6 | 0.5 |
| SNA3-08STEEL | PAN HEAD MACHINE SCREW | STEEL | M3 | 8 | 3.0 | 3.6 | 0.7 |
| SNA3-10STEEL | PAN HEAD MACHINE SCREW | STEEL | M3 | 10 | 3.0 | 3.6 | 0.9 |
| SNA2-06SUS | PAN HEAD MACHINE SCREW | SUS | M2 | 6 | 2.0 | 2.5 | 0.4 |
| SNA2-08SUS | PAN HEAD MACHINE SCREW | SUS | M2 | 8 | 2.0 | 2.5 | 0.6 |
| SNA3-06SUS | PAN HEAD MACHINE SCREW | SUS | M3 | 6 | 3.0 | 3.6 | 0.5 |
| SNA3-08SUS | PAN HEAD MACHINE SCREW | SUS | M3 | 8 | 3.0 | 3.6 | 0.7 |
| SNA3-10SUS | PAN HEAD MACHINE SCREW | SUS | M3 | 10 | 3.0 | 3.6 | 0.9 |
| SNA3-12SUS | PAN HEAD MACHINE SCREW | SUS | M3 | 12 | 3.0 | 3.6 | 1.1 |
| SNA3-16SUS | PAN HEAD MACHINE SCREW | SUS | M3 | 16 | 3.0 | 3.6 | 0.4 |
| B3-10STEEL | HEXAGON HEAD BOLT | STEEL | M3 | 10 | 3.0 | 3.6 | 1.5 |
| B3-12STEEL | HEXAGON HEAD BOLT | STEEL | M3 | 12 | 3.0 | 3.6 | 1.5 |
| . | . | . | . | . | . | . | . |
| . | . | . | . | . | . | . | . |
| . | . | . | . | . | . | . | . |

FIG. 6

| DRAWING NUMBER | NUT SPECIFICATION | | | NUT PLACEMENT DESTINATION CONDITION | |
|---|---|---|---|---|---|
| | NUT CATEGORY | MATERIAL | DIAMETER OF INTERNAL THREAD | SCREW DIAMETER | NECESSARY SCREW LENGTH |
| N12-STEEL | HEXAGON NUT, STYLE 1 | STEEL | M2 | 2.0 | 1.6 |
| N13-STEEL | HEXAGON NUT, STYLE 1 | STEEL | M3 | 3.0 | 2.4 |
| N12-SUS | HEXAGON NUT, STYLE 1 | SUS | M2 | 2.0 | 1.6 |
| N13-SUS | HEXAGON NUT, STYLE 1 | SUS | M3 | 3.0 | 2.4 |
| N22-STEEL | HEXAGON NUT, STYLE 3 | STEEL | M2 | 2.0 | 1.2 |
| N23-STEEL | HEXAGON NUT, STYLE 3 | STEEL | M3 | 3.0 | 1.8 |
| ⋮ | ⋮ | ⋮ | ⋮ | ⋮ | ⋮ |

F I G. 7

108

| DRAWING NUMBER | SCREW OR BOLT SPECIFICATION | | | | SCREW OR BOLT PLACEMENT DESTINATION CONDITION | | |
|---|---|---|---|---|---|---|---|
| | SCREW OR BOLT CATEGORY | MATERIAL | SCREW DIAMETER | SCREW LENGTH | TAPPED HOLE DIAMETER | CLEARANCE HOLE DIAMETER | MINIMUM FASTENING PLATE THICKNESS |
| SNA2-06STEEL | PAN HEAD MACHINE SCREW | STEEL | M2 | 6 | 2.0 | 2.5 | 0.4 |
| SNA2-08STEEL | PAN HEAD MACHINE SCREW | STEEL | M2 | 8 | 2.0 | 2.5 | 0.6 |
| SNA3-06STEEL | PAN HEAD MACHINE SCREW | STEEL | M3 | 6 | 3.0 | 3.6 | 0.5 |
| SNA3-08STEEL | PAN HEAD MACHINE SCREW | STEEL | M3 | 8 | 3.0 | 3.6 | 0.7 |
| SNA3-10STEEL | PAN HEAD MACHINE SCREW | STEEL | M3 | 10 | 3.0 | 3.6 | 0.9 |
| SNA2-06SUS | PAN HEAD MACHINE SCREW | SUS | M2 | 6 | 2.0 | 2.5 | 0.4 |
| SNA2-08SUS | PAN HEAD MACHINE SCREW | SUS | M2 | 8 | 2.0 | 2.5 | 0.6 |
| SNA3-06SUS | PAN HEAD MACHINE SCREW | SUS | M3 | 6 | 3.0 | 3.6 | 0.5 |
| SNA3-08SUS | PAN HEAD MACHINE SCREW | SUS | M3 | 8 | 3.0 | 3.6 | 0.7 |
| SNA3-10SUS | PAN HEAD MACHINE SCREW | SUS | M3 | 10 | 3.0 | 3.6 | 0.9 |
| SNA3-12SUS | PAN HEAD MACHINE SCREW | SUS | M3 | 12 | 3.0 | 3.6 | 1.1 |
| SNA3-16SUS | PAN HEAD MACHINE SCREW | SUS | M3 | 16 | 3.0 | 3.6 | 0.4 |
| B3-10STEEL | HEXAGON HEAD BOLT | STEEL | M3 | 10 | 3.0 | 3.6 | 1.5 |
| B3-12STEEL | HEXAGON HEAD BOLT | STEEL | M3 | 12 | 3.0 | 3.6 | 1.5 |
| ⋮ | ⋮ | ⋮ | ⋮ | ⋮ | ⋮ | ⋮ | ⋮ |

F I G. 1 1 A

108

| DRAWING NUMBER | SCREW OR BOLT SPECIFICATION | | | | SCREW OR BOLT PLACEMENT DESTINATION CONDITION | | |
|---|---|---|---|---|---|---|---|
| | SCREW OR BOLT CATEGORY | MATERIAL | SCREW DIAMETER | SCREW LENGTH | TAPPED HOLE DIAMETER | CLEARANCE HOLE DIAMETER | MINIMUM FASTENING PLATE THICKNESS |
| SNA3-06STEEL | PAN HEAD MACHINE SCREW | STEEL | M3 | 6 | 3.0 | 3.6 | 0.5 |
| SNA3-08STEEL | PAN HEAD MACHINE SCREW | STEEL | M3 | 8 | 3.0 | 3.6 | 0.7 |
| SNA3-10STEEL | PAN HEAD MACHINE SCREW | STEEL | M3 | 10 | 3.0 | 3.6 | 0.9 |

F I G.　1 1 B

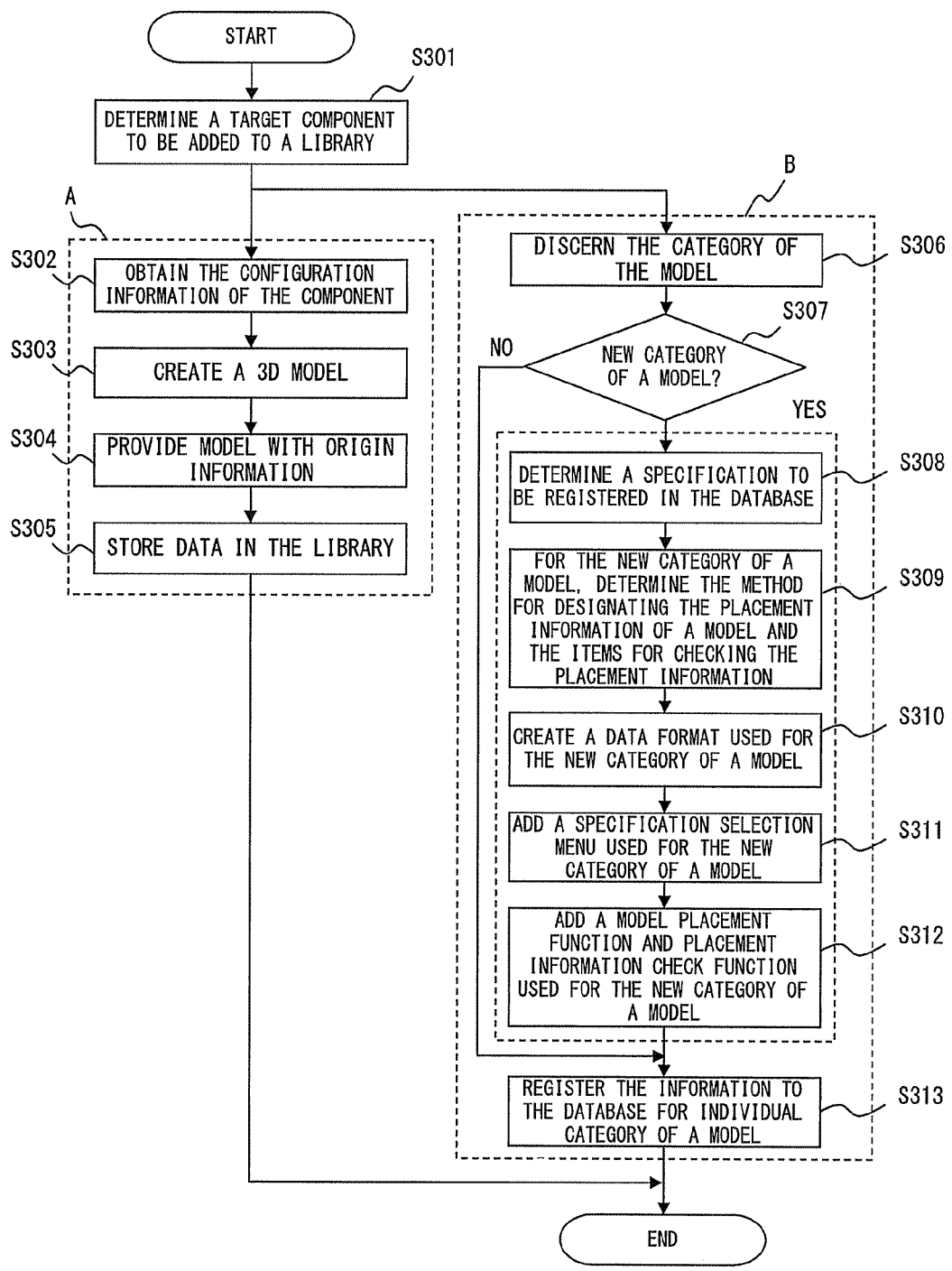
F I G. 1 6

PROGRAM, METHOD AND SYSTEM FOR SELECTING THE THREE-DIMENSIONAL MODEL OF A COMPONENT

BACKGROUND OF THE INVENTION

1. Field of the Invention

The present invention relates to a technique for supporting the utilization of a library storing three-dimensional models of components in a three-dimensional computer aided design (3D-CAD) system.

2. Description of the Related Art

Along with the advancement of computer technologies, the designs of various apparatuses using the 3D-CAD system have become a common practice in recent years. The improvement of efficiency in designing using a 3D-CAD system is being aimed at by pre-storing in a library the 3D models of common components such as screws for use in various kinds of apparatuses and by utilizing the library. In the conventional system, however, a supporting system for a user to utilize such a library effectively has not been adequately developed. This necessitates the user to endure cumbersome manual works in some processes of design.

Such conventional 3D-CAD system and library are described by referring to FIGS. 1 through 3. Note that a 3D model is simply noted as "model" in the following description. FIG. 1 exemplifies the configuration of a conventional system including a 3D-CAD system and a library.

Referring to FIG. 1, the library 1001 stores and manages the models of common components such as screws, bolts, nuts, rivets and such. The components whose models are stored in the library are those necessary for designing apparatuses using the 3D-CAD system 1002 or those highly frequently used. A specific example is, one file is constituted by the data of the model of one component, a drawing number which is the number assigned to the drawing representing an individual model is used for the file name of each model, and such plural files are registered and held in the library 1001.

Users of the system shown in FIG. 1 are the design engineers of various apparatuses. A user designs an apparatus by using the 3D-CAD system 1002.

The 3D-CAD system 1002 comprises a model data load unit 1003 for loading the data of the model of a component onto the 3D-CAD system 1002 from the library 1001 and a model placement unit 1004 placing the loaded model of the component designated by the user to the user designated position.

When carrying out a design, the user selects the model of a required component and makes the model data load unit 1003 load the selected model. The user designates, to the model placement unit 1004, an appropriate position in the model of the apparatus to be designed as the position in which the loaded model of the component is to be placed. In compliance to the designation, the model placement unit 1004 moves the loaded model to the designated position, rotates the model as appropriate and places it in the position. Such a use of the library 1001 frees an individual designer from a need to design the common components such as screws and thereby a higher efficiency of the design work is realized.

Meanwhile, since a very large number of models are stored in the library 1001, it is sometimes difficult for a user to find the model of a component desired by the user from the library 1001 or to manage the data stored therein. Accordingly used is a data management tool 1005 for assisting the user.

The data management tool 1005 is a tool similar to a common file search tool. An individual model is generally included in the library 1001 in the form of a file using the drawing number as the file name. Accordingly, the user pre-investigates the drawing number of the required component by referring to a catalog and/or a specification sheet and inputs the drawing number to the data management tool 1005, thereby being able to search and obtain the model of the required component. Further, a registrar who has registered the model file in the library 1001, a creation date when the model file has been created, etc., in addition to the file name, can generally be utilized as a search condition for the data management tool 1005.

Referring to FIG. 1, the pairs of arrows connecting the library 1001 and model data load unit 1003 indicate that the information specifying a model is provided from the model data load unit 1003 to the library 1001 and that the data of the specified model is sent from the library 1001 to the model data load unit 1003. Further, when the user utilizes the data management tool 1005, a model is specified and loaded by way of the data management tool 1005. This procedure is indicated by the arrows connecting the library 1001 and the data management tool 1005 and the arrows connecting the data management tool 1005 and the model data load unit 1003. In contrast, the operations of loading and placing are mutually independent and therefore no arrow exists to connect the model data load unit 1003 to the model placement unit 1004.

FIG. 2 is the flow chart showing the flow of the process for placing one component in a design utilizing the system shown in FIG. 1. The design process of an individual apparatus and such includes the process for placing models of components in the model of a design target. FIG. 2 is the flow chart of the process related to such a placement of one component.

In the step S1001 (also abbreviated as "S1001" hereinafter), the user determines the model of a component to be loaded. As described above, a model is managed by the file name using the drawing number. The user accordingly determines the specification of the required component, investigates the drawing number of a specific component satisfying the determined specification by using a catalog, a specification document and such, and determines the drawing number.

In S1002, the user then searches for the model as the loading subject determined in the S1001 by using the data management tool 1005. If there is the model specified by the user in the library 1001, the model of the loading subject is selected as a result of the search.

The selected model is loaded onto the 3D-CAD system 1002 by the model data load unit 1003 in the following S1003.

In the subsequent S1004, the user designates both the position and direction, in which the model is to be placed, and the loaded model, so that the model placement unit 1004 reflects the model of the component to the model of the design target in accordance with the user's designation. That is, the model placement unit 1004 moves the model of the component to a position designated in the model of the design target, rotates the model as appropriate and places the model of the component in the position.

FIG. 3 is a diagram schematically illustrating the process of FIG. 2. FIG. 3 shows that the model of a screw 1006 is loaded onto the 3D-CAD system 1002 from the library 1001 and that the model of the screw 1006 is placed in a screw hole (more precisely, the model thereof) for fastening plates 1007 and 1008 together.

The conventional system as described by referring to FIGS. 1 through 3 bears the problems as follows.

A first problem is that the S1001 of FIG. 2 takes the user effort to investigate a drawing number. In many cases, the model of a component is registered in the library 1001 by using the file name utilizing the drawing number of the aforementioned model as exemplified above.

Therefore, the user needs to determine a specific drawing number on the basis of the specification of the required component. In the current situation, the user performs an investigation for determining a drawing number by referring to a catalog, a specification sheet or the like. The investigation is not automated and therefore is time consuming.

A second problem is that it also takes an effort to search a model corresponding to the determined drawing number from the library 1001. It takes the user efforts to find a target model from the library 1001 if it stores a very large number of models. Even if the models are hierarchically grouped, it takes the user to trace along a deep hierarchical layer to find the target model if there is a large number of models.

Meanwhile, in order to reduce the amount of effort, the user may search it by using a file name as key by using the data management tool 1005, which requires the user to operate simultaneously two applications alternately, that is, the 3D-CAD system 1002 and data management tool 1005, undermining a work efficiency.

Techniques related to the above described problems include the following.

A design assisting device for printed wiring board noted in reference patent document 1 comprises a part library storing the manufacture conditions such as the applicability of a water cleaning and a manufacture condition library storing conditions, which are represented by the combinations of the manufacture conditions and/or the arrangement information of parts, and the validity of manufacturing characteristics by correlating between the conditions and the validity.

When a designer specifies a required function, a part(s) possessing the function is/are searched from the part library. The designer selects a part to be used from among the searched part(s). Upon selecting all the required parts, the designer determines the arrangement positions of the respective parts on the printed wiring board. Then, the design assisting device for printed wiring board compares the manufacture conditions and the determined arrangement positions of the selected parts with the contents of manufacture condition library, thereby judging the producibility (i.e., the validity of manufacturing characteristics) of each part. This configuration enables a designer without the assembly know-how to examine the producibility and modify the design if required.

A component selection support system noted in reference patent document 2 is configured in advance so that components possessing the same functional characteristics are classified into a group, a group code is assigned to the group, parameters such as the price and life of each component are registered in a library, and the search conditions represented by the sort conditions of the parameters are determined.

When performing a design, the group code is designated by the designer and a most optimal component is automatically searched and selected from among the group on the basis of the search condition. This configuration makes it possible to select the most appropriate component without depending on the experience of a designer.

Patent document 1: Laid-Open Japanese Patent Application Publication No. 2001-196720

Patent document 2: Laid-Open Japanese Patent Application Publication No. 2006-59006

The inventions respectively noted in the reference patent documents 1 and 2 are in common in terms of sorting a plurality of components into one group in accordance with the function. Such a grouping, however, is not sufficient for solving the problems described above. The reason is that the number of such groups may be sometimes so enormous that finding and designating a desired group from among the enormous number of groups causes a user as many manual operations as those caused when finding and designating a desired component from among an enormous number of components.

There are various kinds of components including mechanical components such as screws, bolts and nuts in addition to the electronic circuit components exemplified in the reference documents 1 and 2. Grouping together, into a single group, a plurality of kinds of components which satisfy a specification representing the same function and which are mutually interchangeable is not always appropriate for mechanical components.

For example, although two screws with different size are the same in terms of a common function of fastening two members together, they are not interchangeable in a situation in which a screw hole of a specific size is already determined. There is accordingly the case of mechanical components in different sizes to be regarded as corresponding to different functions and therefore they are to be categorized into different groups.

Meanwhile, there are diverse sizes of mechanical components. Moreover, the size of one mechanical component is seldom represented by a single value, and instead represented by a combination of respective sizes of a plurality of parts of a component. There are a large number of such combinations in a certain mechanical component. Therefore, grouping a mechanical component by size increases the number of groups enormously.

It is cumbersome for the user to find a desired group from among such an enormous number of groups. Therefore the method of grouping components by function is insufficient to solve the problems described above.

SUMMARY OF THE INVENTION

Therefore, the purpose of the present invention is to enable a user to find a three-dimensional (3D) model of a desired component easily in a design utilizing a 3D computer aided design system.

A program according to an aspect of the present invention is the program for making a computer functioning as three-dimensional computer aided design (3D-CAD) system executes the process for selecting the 3D model of a component from a library storing the 3D models of plural components by correlating them with the respective pieces of identification information. The program may be provided by being stored in, for example, a computer readable storage medium.

The process which the program makes the computer execute comprises a category designation step for designating a category of a component; a menu display step for displaying, in a screen of the 3D-CAD system, a menu for designating respective values of plural items representing a specification of the component, the plural items being predetermined in accordance with the category; a selection step for performing an operation of narrowing down, on the basis of the value designated by way of the menu, records of a database which includes each record for each of the plural components, where each record of the database correlates the plural items representing the specification with the identification information; a menu update step for extracting, from the narrowed-down database, a possible value of an item of the plural items with a value being undetermined in the menu and updating one or more choices selectable by way of the menu on the basis of the extracted possible value; and a determination step for determining, to be a 3D model to be loaded from the library, the 3D model of the component uniquely determined after repeating the selection step and the menu update step for one time or more.

Further, according to another aspect of the present invention, a method executed by the computer in accordance with the program and a 3D-CAD system implemented by the program are provided.

An embodiment of the present invention is configured to enable an automatic narrow-down merely by a user designating the values of respective items by way of a menu and thereby only the specification(s) matching the designated content is/are left as selectable choice(s) even if the number of specifications is enormous due to the combinations of the values of plural items representing the specification.

An embodiment of the present invention is configured to enable the user to find a 3D model of a component of a target specification more simply and less cumbersome than the conventional method in a design utilizing a 3D-CAD system. The embodiment of the present invention accordingly contributes to shortening a design time.

BRIEF DESCRIPTION OF THE DRAWINGS

FIG. 2 is the flow chart showing the flow of the process for placing one component in the conventional system;

FIG. 5 is the flow chart of a process related to one component carried out in an embodiment of the present invention;

FIG. 6 is a specific example of the data structure of a library model database;

FIG. 7 is a specific example of the data structure of a library model database;

FIG. 11A exemplifies a selectable model database in an initialized state;

FIG. 11B exemplifies a selectable model database in a narrowed-down state;

FIG. 16 is the flow chart of the process for adding the model of a component to a library.

DESCRIPTION OF THE EMBODIMENTS

Figure 1:
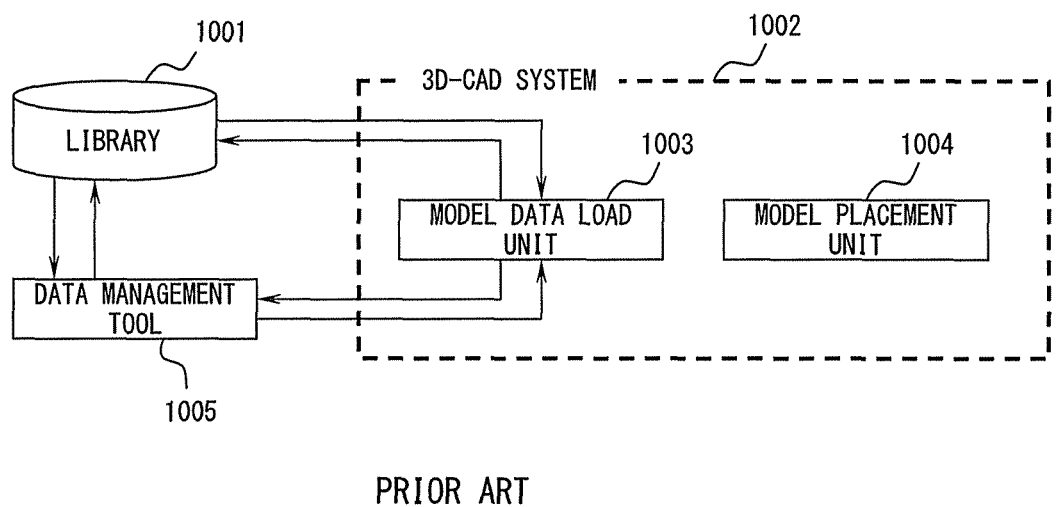
FIG. 1 exemplifies the configuration of a conventional system including a 3D-CAD system and a library.

The following is a description in detail of the embodiments of the present invention by referring to the accompanying drawings. The following terminology is used in the following description.

A three-dimensional (3D) model utilized in a 3D-CAD system is simply called "model".

An apparatus currently in progress to be designed by using a 3D-CAD system is simply called "design target". The design target may be an arbitrary apparatus such as an electronic device including a portable phone, a mobile body including a vehicle; and in addition, various kinds of machinery, instrument, furniture, building and such.

The designer of a design target is a user of the 3D-CAD system. The designer of a design target is generally different from the model maker or model designer of a component. Unless otherwise noted herein, the notation of "designer" indicates the designer of a design target, not of a component.

The notation of a component per se may not sometimes be different from that of a model of the component. For example, the drawing representing a screw is not different from the drawing representing the model of the screw, and therefore the description does not discriminate the screw per se and the model of the screw. Further, the specification of a screw may be noted as "specification of the model of a screw".

The spot in which a designer intends to place the model of a component in the model of a design target is called "placement destination". The information indicating a placement destination is called "placement information".

While a description in detail is provided later, the model of a component is narrowed down in steps in the process of determining, to be one, the model of a component to be used. The expression "(Models being) selectable" in a certain step means that the models matched a narrow-down condition when a narrowing-down operation was performed in the immediately previous step and, as a result, remain as choices of a model to be loaded and placed in the current step.

Figure 4:
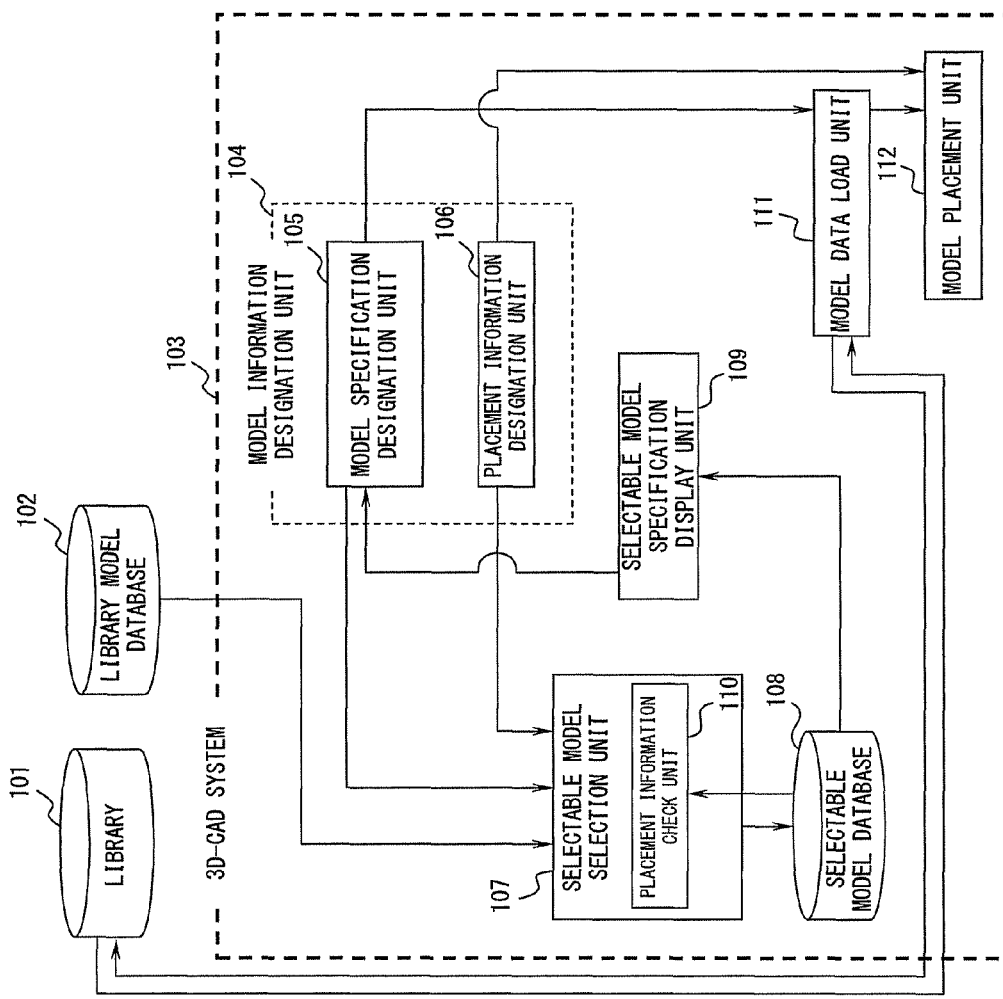
FIG. 4 is a diagram showing a system configuration, by using functional blocks, according to an embodiment of the present invention.

FIG. 4 is a diagram showing a system configuration, by using functional blocks, according to an embodiment of the present invention.

A library 101 stores the data of models of plural kinds of components (simply noted as "plural components" herein) for loading onto, and utilized in, a 3D-CAD system 103. Specific examples of components include a screw or bolt, nut, washer, rivet and connecter. The present embodiment uses a drawing number as identification information for identifying a component. Further, the model of an individual component is stored, in a library 101, by being formatted as a file bearing the drawing number of the aforementioned component as the file name in order to correlate the drawing number and model.

A constraint condition related to the specification and placement of each model stored in the library 101 is related with the drawing number of each model and is stored in a library model database 102. That is, the data within the library 101 and the data within the library model database 102 are correlated by using the identification information, i.e., the drawing number. A detailed example of the data structure of the library model database 102 is described in detail later associated with FIGS. 6 and 7. Note that the items required for representing the specification and constraint condition are different for each category of component and therefore the present embodiment is accordingly configured such that the library model database 102 is an aggregate of a plurality of databases separately for each category of component.

The 3D-CAD system 103 comprises a model information designation unit 104, a selectable model selection unit 107, a selectable model database 108, a selectable model specification display unit 109, a model data load unit 111 and model placement unit 112. Further, the model information designation unit 104 comprises a model specification designation unit 105 and a placement information designation unit 106; and the selectable model selection unit 107 comprises a placement information check unit 110. Note that the 3D-CAD system 103 comprises a series of functions required as a common 3D-CAD system in addition to the above noted constituent components, although they are not shown in any drawings because they have no relation with the present embodiment.

An example of the hardware implementing the library 101 and library model database 102 is a nonvolatile large capacity storage apparatus such as a hard disk drive. An example of the hardware implementing the 3D-CAD system 103 is a common computer. Among the constituent components of the 3D-CAD system 103, the selectable model database 108 is implemented by a storage apparatus, such as random access memory (RAM), comprised by the computer. Other constituent components are generally implemented by software; it is clear that they may be implemented by software, firmware, hardware, or a discretionary combination of them.

Note that the program for making a computer function as the 3D-CAD system 103, the data of the library 101, and the data of the library model database 102 may be developed or provided separately from each other. In order to show this fact, FIG. 4 shows the library 101 and library model database 102 on the outside of the 3D-CAD system 103. The library 101 and library model database 102, however, may be included within the 3D-CAD system 103. That is, the library 101 and library model database 102 may be incorporated in the 3D-CAD system 103 by being tightly integrated with other constituent components.

The internal of the 3D-CAD system 103 is outlined here while the relationship between the individual constituent components pointed by arrows and other aspects are described later.

Among the constituent components internal to the 3D-CAD system 103, what are related to the mechanism easing the selection of the specification of a component are the model specification designation unit 105, selectable model selection unit 107, selectable model database 108 and selectable model specification display unit 109. The placement information designation unit 106, placement information check unit 110, model data load unit 111 and model placement unit 112 are comprised for implementing the function for eliminating various cumbersome operations conventionally required in addition to selecting the specification of a component. Therefore, the utilization of the system shown in FIG. 4 enables the designer of a design target to carry out the design more efficiently than the conventional method in terms of aspects other than selecting a model as well as an aspect of selecting a model.

The model information designation unit 104 designates the information related to the model of a component on the basis of the input from a user. In specific, the model specification designation unit 105 designates the specification of a model and the placement information designation unit 106 designates the placement information of the model.

The selectable model database 108 stores only the data related to the presently selectable model(s) by being extracted among the data stored in the library model database 102. The selectable model database 108 is a database temporarily keeping data and therefore can be implemented by utilizing volatile memory such as RAM.

A control for narrowing down the data to be stored in the selectable model database 108 in a manner of the above-mentioned extraction of the data is carried out by the selectable model selection unit 107. The control is based on the content designated by the model specification designation unit 105 or placement information designation unit 106. Further, the placement information check unit 110 checks whether or not the specification of the model and the placement destination of the model are in a relationship satisfying the constraint condition. The selectable model selection unit 107 performs a control in accordance with the check result.

The selectable model specification display unit 109 displays an input menu for receiving an input from the user in a display screen. The input menu displays only the specifications of the selectable models as choices. A repetition of a series of processes, that is, the selectable model specification display unit 109 displaying a menu, the user input, the model information designation unit 104 designating the information on the basis of the input content and the selectable model selection unit 107 narrowing down the selectable model database 108 on the basis of the content of the designation, narrows down the models of the specifications desired by the user in steps.

The model data load unit 111 loads the model of a component from the library 101, and the model placement unit 112 places the loaded model in the spot indicated by the placement information.

Next is a description of the outline of the process related to one component carried out in an embodiment of the present invention by referring to the flow chart shown in FIG. 5.

In the step S101 (also simply noted as "S101" hereinafter), the user inputs the specification of a model or a piece of placement information to the 3D-CAD system 103. The menu for inputting a specification is displayed in a display screen controlled by the selectable model specification display unit 109. The placement information is input by using, for example, a mouse.

Then, the model specification designation unit 105 or placement information designation unit 106 comprised by the model information designation unit 104 designates the content input by the user in the selectable model selection unit 107 which then narrows down the selectable model database 108 on the basis of the designated content.

In the next S102, the model information designation unit 104 judges whether or not the specification of a model and placement information are uniquely established as a result of thusly narrowing down the selectable model database 108. If they are established, the judgment is "yes" and the process proceeds to S103, while if they are not established, the judgment is "no" and the process returns to the S101.

The steps S101 and S102 are repeated until the judgment of the S102 results in "yes". For example, if the specification of the component is defined by plural items, the loop of the S101 and 102 is repeated until the values of all the items are uniquely established.

As the S101 is executed repeatedly, the number of records stored in the selectable model database 108 is reduced to a number no more than the number at the previous execution of the S101. That is, the selectable range in the S101 is narrowed down at every repetition. The user is only required to select one of respective choices for plural items and thereby the user is not required to endure a cumbersome work such as manually investigating a catalog.

Further, the selectable model specification display unit 109 for displaying a menu for selecting a specification is incorporated in the 3D-CAD system 103. This configuration accordingly eliminates a need for the user to operate the data management tool 1005 and 3D-CAD system 1002 alternately as is required for the conventional example of FIG. 1.

If the judgment of the S102 is "yes", the process proceeds to S103 in which the model data load unit 111 automatically loads the uniquely determined model of the component onto the 3D-CAD system 103 from the library 101.

In the next S104, the model placement unit 112 places the loaded model automatically at the spot, in an appropriate orientation, which has been established by the execution of the S101 for one time or more. As such, a manual work is not required of the user between the steps S103 and S104. Therefore, from the user's viewpoint, it looks as though the model of the component is loaded and placed directly at the designated spot. That is, the user is not required to give the 3D-CAD system the individual commands, that is, commands for loading and placing, as in the case of using the conventional system of FIG. 1.

The process related to one component completes in the above-mentioned manner. If the design target comprises a plurality of components, the process shown in FIG. 5 is repeated for the number of the components.

Next is a description of a specific example of the data structure of the library model database 102 by referring to FIGS. 6 and 7.

FIGS. 6 and 7 show the respective examples, related to components of the categories "screw or bolt" and "nut", of the data stored in the library model database 102. As it is clear from the comparison between FIG. 6 and FIG. 7, the necessary items are generally different for a category and therefore the library model database 102 is constituted by a plurality of databases separately for the categories of models. The category may also include pin, washer, rivet, connector and such, in addition to the above described categories of components.

The commonality between FIGS. 6 and 7 lies in storing one or more items representing specification and one or more items representing the constraint conditions related to the placement with the both kinds of items being correlated with the drawing number as the identification information. FIGS. 6 and 7 each show a record related to one model in one row.

In FIG. 6, the items representing the specification are categorized into one title "screw or bolt specification", including four items, i.e., "screw or bolt category", "material", "screw diameter" (i.e., the diameter of external thread) and "screw length". The "screw or bolt category" is a detail category for further grouping the category of the "screw or bolt", with its values including "pan head machine screw", "hexagon head bolt" and such. The "material" is represented by "STEEL" and "SUS" (according to the notation of the Japanese Industrial Standard (JIS)), meaning steel and stainless steel, respectively, in the example of FIG. 6. The "screw diameter" is represented by the signs "M2" and "M3" according to the JIS. The "M2" indicates that the screw diameter is 2.0 mm. The "screw length" is expressed by a numeral value in millimeter unit. In FIG. 7, the items representing the specification likewise include three items categorized under the title "nut specification", including three items, i.e., "nut category", "material" and "diameter of internal thread".

Meanwhile, the items representing the constraint condition related to the placement are three items, i.e., "tapped hole diameter", "clearance hole diameter" and "minimum fastening plate thickness", categorized as one title "screw or bolt placement destination condition" in the case of FIG. 6.

When fastening two members by way of an externally threaded screw, in general, an internal thread is applied only to the internal face of a hole bored in the member on the end side of the screw. The hole is called "tapped hole" in the following description. In contrast, a hole having a diameter a little larger than that of the tapped hole is bored in the member on the side of the head of the screw. This hole is called "clearance hole" in the following description. Since both the tapped hole and clearance hole are for fastening with a screw, they are sometimes generally called "screw hole" in the following description.

Figure 3:
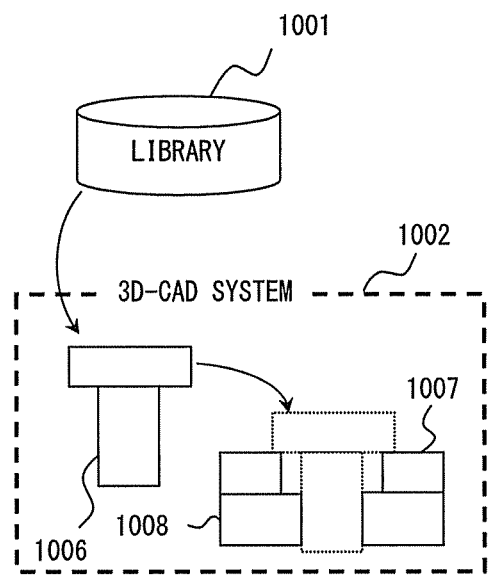
FIG. 3 is a diagram schematically illustrating the process of FIG. 2.

An internal thread is not applied to the internal surface of the clearance hole and therefore the screw is naturally engaged with only the internal surface of the tapped hole. In FIG. 3 as an example, the tapped hole is bored in the plate 1008, and the clearance hole is bored in the plate 1007.

The "tapped hole diameter" and "clearance hole diameter" shown in FIG. 6 indicate the values permissible as the respective diameters of the tapped hole and clearance hole, which form the placement destination of a screw where the screw is placed. Further, the present embodiment defines a minimum thickness required for the member in which a clearance hole is bored as "minimum fastening plate thickness". In the example of FIG. 3, if the plate 1007 is thicker than the value of a minimum fastening plate thickness specified for a certain screw, the spot of the screw hole shown in FIG. 3 and the applicable screw satisfy the constraint condition of the minimum fastening plate thickness.

Likewise, the items representing the constraint condition related to the placement as shown in FIG. 7 are two items, i.e., "screw diameter" and "necessary screw length", categorized as the title "nut placement destination condition". The "screw diameter" specifies the value permissible as the value of the diameter of the external thread of a screw or bolt to be combined with the nut. The "necessary screw length" specifies the minimum length necessary as a length of engagement between the nut and screw or bolt.

As exemplified in FIGS. 6 and 7, the data format of an item representing a specification may be a numeral value or a sign. The sign may be expressed by character string data or by coding using a numeral value. Further, in addition to items such as "screw or bolt category" and "material", there may be an item or items representing the characteristics of a form and/or a color by using respective signs. In addition to the item indicating the length such as "screw diameter", the items expressed in numeral values may include, for example, other items representing sizes such as the area size of the specific part of a component or the volume of a component, items indicating the characteristic of a form such as the radius of curvature of the specific part of a component, and items indicating the physical characteristic of a component such as the mass of a component. Further, if a component is used for an electronic circuit, the items indicating the electrical characteristics of the component are also used as those representing the specification.

Figure 8:
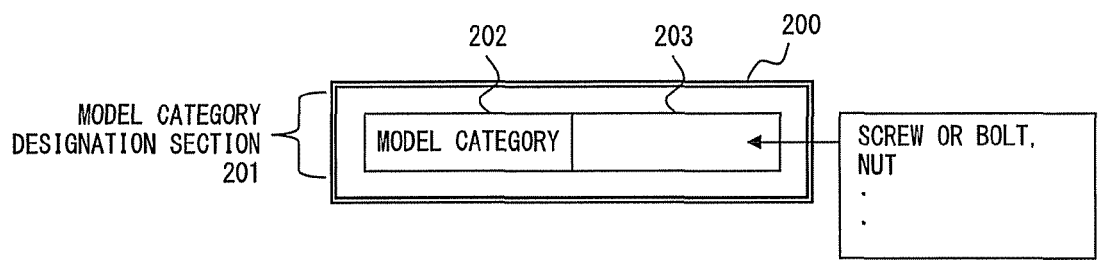
FIG. 8 exemplifies a model category selection menu.
Figure 9:
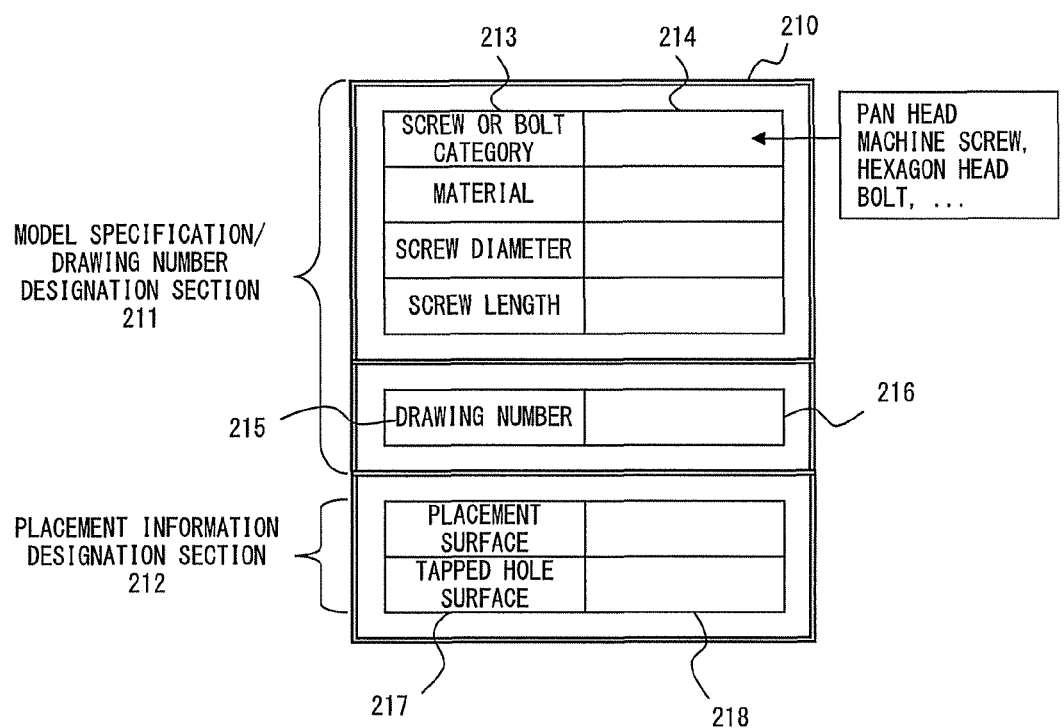
FIG. 9 exemplifies a screw- or bolt-use information input menu.
Figure 10:
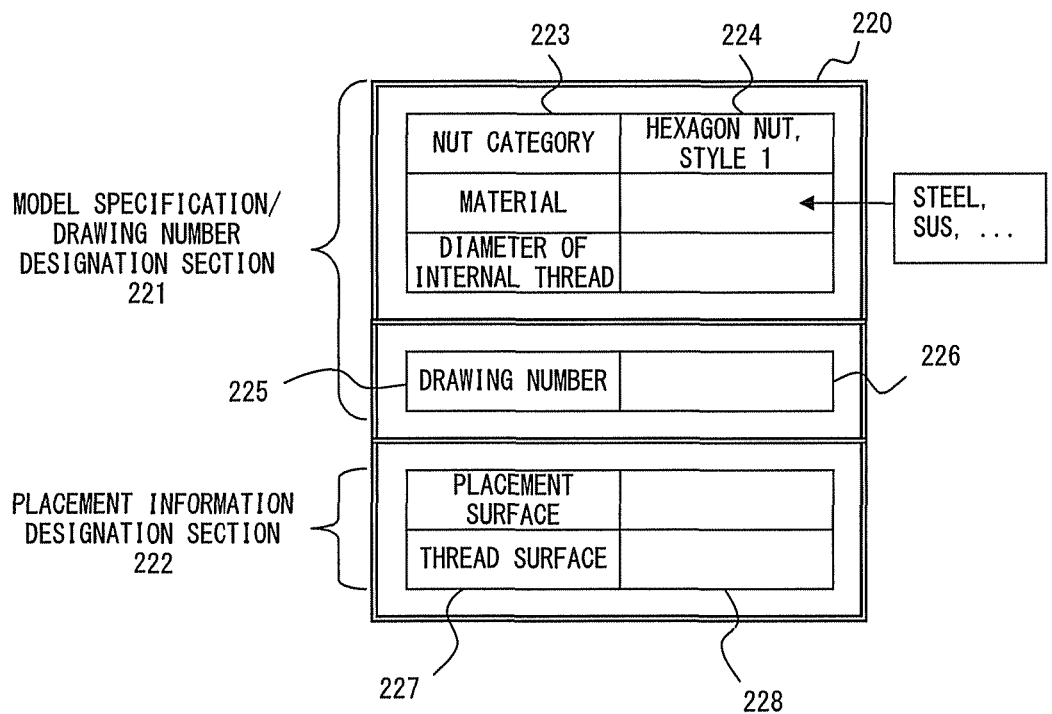
FIG. 10 exemplifies a nut-use information input menu.

Next is a description of a menu which the selectable model specification display unit 109 displays in a display screen of the 3D-CAD system 103 by referring to FIGS. 8 through 10.

FIG. 8 exemplifies a model category selection menu 200 for selecting the category of a model. The model category selection menu 200 comprises a model category designation section 201. The model category designation section 201 includes a heading 202 named "model category" and an input section 203 for the user to select one of choices selectable as a model category. FIG. 8 exemplifies "screw or bolt" and "nut" as the selectable choices.

A specific user interface for the input section 203 may be a discretionary configuration depending on the embodiment, such as a radio button, a list box, a text box and a combo box possessing the function of both the list box and text box. When using a text box or a combo box, a necessary process is carried out, such as a check as to whether the inputted text applies to the selectable model category. This configuration enables the user to select one of the selectable choices by utilizing the model category selection menu 200. The following description is provided by assuming the user interface for the input section 203 or the like as a list box for a convenience of description, it is not, however, to intend to limit the kind of a user interface.

As a model category is selected, the selectable model specification display unit 109 then displays an information input menu corresponding to the selected model category in the display screen. FIG. 9 exemplifies a screw- or bolt-use information input menu 210 displayed in the case of "screw or bolt" being selected as the model category; and FIG. 10 exemplifies a nut-use information input menu 220 displayed in the case of "nut" being selected as the model category. That is, the necessary items are different for each category of a model and therefore the information input menu of FIG. 9, FIG. 10 or others is displayed in the screen in accordance with the category designated by the user by way of the model category selection menu 200 shown in FIG. 8.

Referring to FIG. 9, the screw- or bolt-use information input menu 210 comprises a model specification/drawing number designation section 211 and a placement information designation section 212. The model specification/drawing number designation section 211 is used for designating one or more pieces of information for uniquely identifying a model. The placement information designation section 212 is related to a spot for placing a model.

FIG. 9 corresponds to FIG. 6. That is, the four items of names, i.e., "screw or bolt category", "material", "screw diameter" and "screw length", which represent the specifications of the category of "screw or bolt" in FIG. 6 are written in the heading 213 of the model specification/drawing number designation section 211 of FIG. 9. The model specification/drawing number designation section 211 also comprises an input section 214 corresponding to the four items of heading 213. The user interface for the input section 214 is, for example, four list boxes corresponding to the respective four items.

Looking at FIG. 6, for example, "screw or bolt category" can possibly take the values, i.e., "pan head machine screw" and "hexagon head bolt". Therefore, the "pan head machine screw" and "hexagon head bolt" are displayed, as selectable choices, in the input section 214 corresponding to the "screw or bolt category" of FIG. 9. Likewise, respective selectable choices are also displayed in the input section 214 respectively for three items, i.e., "material", "screw diameter" and "screw length".

Further, the model specification/drawing number designation section 211 also comprises a heading 215, i.e., "drawing number", and an input section 216 corresponding to the heading 215. At every repetition of the loop consisting of the steps S101 and S102 of FIG. 5, that is, at every time the user designates a piece of information by using the screw- or bolt-use information input menu 210, the models matching the designated content are narrowed down. That is, the selectable drawing numbers are gradually narrowed down. The user is accordingly enabled to select one model by inputting in the input section 216 by selecting one drawing number from among the narrowed-down small number of drawing numbers.

As described above, the present embodiment is configured to enable the user to allow a mere designation of the values of the respective items by way of the menu even if there are plural items representing the specification and if there is accordingly extremely large number of specifications due to the combination of these plural items. Further, the selectable model specification display unit 109 displaying the various menus as shown in FIGS. 8, 9 and 10 is a part of the 3D-CAD system 103, and therefore the only work required of the user is an operation of one application, that is, the 3D-CAD system 103. That is, the present embodiment does not require the user to endure a cumbersome operation in the conventional system, that is, the alternate operations of two applications, i.e., the 3D-CAD system 1002 and data management tool 1005, which are shown in FIG. 1. Therefore, the work required of the user for identifying the model of a desired specification is less than that of the conventional system.

The placement information designation section 212 comprises heading 217, in which "placement surface" and "tapped hole surface" are written, and a display section 218 corresponding to the aforementioned two items in the heading 217. There is a typical pattern corresponding to the model category in a placement destination of a model and therefore the placement information designation section 212 possesses items in accordance with the pattern.

For example, the placement destination of a screw or bolt is generally a screw hole. FIG. 9 shows the example identifying a screw hole by way of the "placement surface" and "tapped hole surface". The "placement surface" of the screw or bolt in this case is a surface with which the bearing surface of the head of the screw or bolt contacts among the surfaces of target members to be fastened by the aforementioned screw or bolt. An example of the "placement surface" is the top surface of the plate 1007 shown in FIG. 3. Also, the "tapped hole surface" is the cylindrical internal surface of the tapped hole, which is internally is threaded. If the models of the target members to be fastened by a screw or bolt have been already created appropriately with a tapped hole and a clearance hole being appropriately modeled therein, the designations of the placement surface and tapped hole surface establish uniquely the position of the placement destination of the screw or bolt and the orientation of the aforementioned screw or bolt.

The present embodiment is configured such that the designations of a placement surface and of a tapped hole surface in the model of a design target by a user utilizing a pointing device cause the display section 218 to display the information related to the designated placement surface and tapped hole surface. It is, however, clear that any other user interfaces may be adopted. An example of the content displayed in the display section 218 is described later.

When the "screw or bolt" is selected as the model category, the user is enabled to designate the specification and placement destination of the model by way of the screw- or bolt-use information input menu 210. Likewise, when the "nut" is selected as the model category, the user is enabled to designate the specification and placement destination of the model by way of a nut-use information input menu 220 shown in FIG. 10.

Referring to FIG. 10, the nut-use information input menu 220 comprises a model specification/drawing number designation section 221 and a placement information designation section 222.

The model specification/drawing number designation section 221 resembles the model specification/drawing number designation section 211 of FIG. 9; the specific items included therein, however, are different from FIG. 9. That is, FIG. 10 corresponds to FIG. 7, and the names of three items, i.e., the "nut category", "material" and "diameter of internal thread", which represent the specification of the category "nut" in FIG. 7 are written in the heading 223 of the model specification/drawing number designation section 221 shown in FIG. 10. The model specification/drawing number designation section 221 also comprises an input section 224 corresponding to these three items of heading 223. In terms of the user interface for the input section 224 being discretionary, the input section 224 is similar to the input section 214 of FIG. 9. FIG. 10 exemplifies that "hexagon nut, style 1" is already selected as the "nut category" and the "material" is not yet selected, indicating the choices of "STEEL" and "SUS" being selectable.

Likewise FIG. 9, the model specification/drawing number designation section 221 also comprises a heading 225, that is, "drawing number", and an input section 226 corresponding to the heading 225.

The placement information designation section 222 comprises a heading 227 in which "placement surface" and "thread surface" are written and a display section 228 corresponding to the two items of the heading 227. A nut is generally used by combining with a bolt. Here, the external surface of a member, of two members fastened by a bolt, on the side of the end of a bolt is called the "placement surface" of a nut, and the external surface of the shank of a bolt, that is, the externally threaded cylindrical external surface, is called "thread surface". For example, when further placing a nut in FIG. 3, the placement surface of the nut is the bottom surface of the plate 1008. The position and orientation of placing a nut is uniquely established by the condition that the nut is in contact with the placement surface and that the internal thread of the nut is engaged with the external thread of the thread surface, and therefore FIG. 10 exemplifies the case of designating the "placement surface" and "thread surface" as the placement information of a nut.

Note that the above examples utilize the information indicating an already existing certain surface, such as "placement surface", as the placement information; the placement information, however, varies with embodiment. For example, the following pieces of information may be used as the placement information:

The information indicating a certain point. For example, three dimensional coordinates of the point.

The information indicating the boundary between surfaces.

The information indicating the model of another different component which is already loaded and placed in the model of a design target and which is accordingly included as a part of the design target. For example, identification information for the model of the different component.

The information identifying and indicating a part possessing the characteristic form of a design target. For example, the information indicating an end, an edge, a protruded part (i.e., convex part) such as protrusion, a depressed part (i.e., concave part) such as slit and hole, a through hole including a clearance hole, etc.

For example, the information indicating a bolt per se may be used as the placement information of a nut, in place of the "thread surface" of FIG. 10. Such a case may require an ancillary operation, such as the placement information designation unit 106 detects the "thread surface" of the indicated bolt on the basis of the data of the model of the bolt indicated by the placement information.

Next are descriptions of the operation of the selectable model selection unit 107 and the data retained by the selectable model database 108 in detail by referring to FIGS. 11A and 11B. FIGS. 11A and 11B exemplify the case of the category of a model being "screw or bolt".

The content of the selectable model database 108 is initialized for each component, and it is narrowed down in the process of the selection of one component progressing. The selectable model selection unit 107 controls the initialization and narrow-down. Note that the initialization corresponds to the arrow traveling to the selectable model selection unit 107 from the library model database 102 and the arrow travelling to the selectable model database 108 from the selectable model selection unit 107, all of which are shown in FIG. 4, and the narrow-down corresponds to the arrow traveling to the selectable model database 108 from the selectable model selection unit 107, both of which are shown in FIG. 4.

FIG. 11A exemplifies a selectable model database 108 in an initialized state. The selectable model selection unit 107 copies the content of the library model database 102 into the selectable model database 108, thereby initializing the selectable model database 108.

The timing of the initialization may be appropriately determined depending on the embodiment. For example, after the user designates a category by using the model category selection menu 200 of FIG. 8, the selectable model selection unit 107 copies only the database of the designated category from the library model database 102 into the selectable model database 108. The example of FIG. 11A assumes such timing.

Alternatively, before a category is designated, the selectable model selection unit 107 may copy the database of all categories from the library model database 102 into the selectable model database 108. In such a case, the selectable model selection unit 107 deletes the database of unrelated categories from the selectable model database 108 after a category is selected. The deletion is also a kind of the narrow-down operation in order to keep only data related to the selectable models.

Regardless of the initialization being at either of the above described timing, the selectable model database 108 immediately after the designation of "screw or bolt" as the category is retaining the same content as that exemplified for the library model database 102 of FIG. 6, that is the state of FIG. 11A.

The following is a description of the case in which the user thereafter selects the "pan head machine screw" and "STEEL" as the "screw or bolt category" and "material", respectively, by using the screw- or bolt-use information input menu 210 shown in FIG. 9, and designates the tapped hole of the tapped hole diameter being 3.0 mm as the placement destination by using a mouse. FIG. 11A indicates the data matching the selection result and the designation result by the mesh shading. Note that the user carrying out three operations, i.e., the selection of "screw or bolt category", the selection of "material" and the designation of a tapped hole, may be in a discretionary sequence.

In FIG. 11A, there are three records satisfying all of the three conditions, i.e., the value of "screw or bolt category" being "pan head machine screw", the value of "material" being "STEEL" and the value of "tapped hole diameter" being "3.0". The values of "drawing number" of these three records are "SNA3-06 STEEL", "SNA3-08 STEEL" and "SNA3-10 STEEL". After the user carries out the three operations, i.e., the selection of "screw or bolt category", the selection of "material" and the designation of a tapped hole, the selectable model database 108 is accordingly narrowed down to only the above-mentioned three records as shown in FIG. 11B.

The selectable model selection unit 107 controls such narrow-down of records. As described above, while the sequence of the three operations carried out by the user is discretionary, a narrowing-down is performed in, for example, the following sequence.

When the user first performs selection in terms of "screw or bolt category", the selectable model selection unit 107 narrows the selectable model database 108 down to twelve records having the value of "screw or bolt category" being the "pan head machine screw". The user then designates a tapped hole, prompting the placement information designation unit 106 to calculate the tapped hole diameter of the designated tapped hole. The selectable model selection unit 107 receives the value "3.0" as the result of the calculation and narrows the selectable model database 108 down to only eight records in which the value of the "tapped hole diameter" being "3.0" of the above described twelve records. The user then performs selection in terms of "material", prompting the selectable model selection unit 107 to narrows the selectable model database 108 down to the three records in which the value of the "material" being "STEEL" of the above eight records. If all of the above-mentioned eight records had the value of the "material" being "STEEL", none of these eight records would be eliminated as a result of the selection in terms of the "material", resulting in the selectable model database 108 remaining unchanged and retaining the eight records.

Note that, in FIG. 4, the arrows traveling to the selectable model selection unit 107 from the model specification designation unit 105 and placement information designation unit 106, respectively, represent that the content of the user designation is designated to the selectable model selection unit 107. Further, the narrow-down in accordance with the designated content corresponds to the arrow traveling to the selectable model database 108 from the selectable model selection unit 107. The arrow traveling to the selectable model specification display unit 109 from the selectable model database 108 corresponds to the display of various menus on the basis of the content of the selectable model database 108. The arrow traveling to the model specification designation unit 105 from the selectable model specification display unit 109 corresponds to the selection and designation of a specification from among the choices displayed in the menu.

Figure 12:
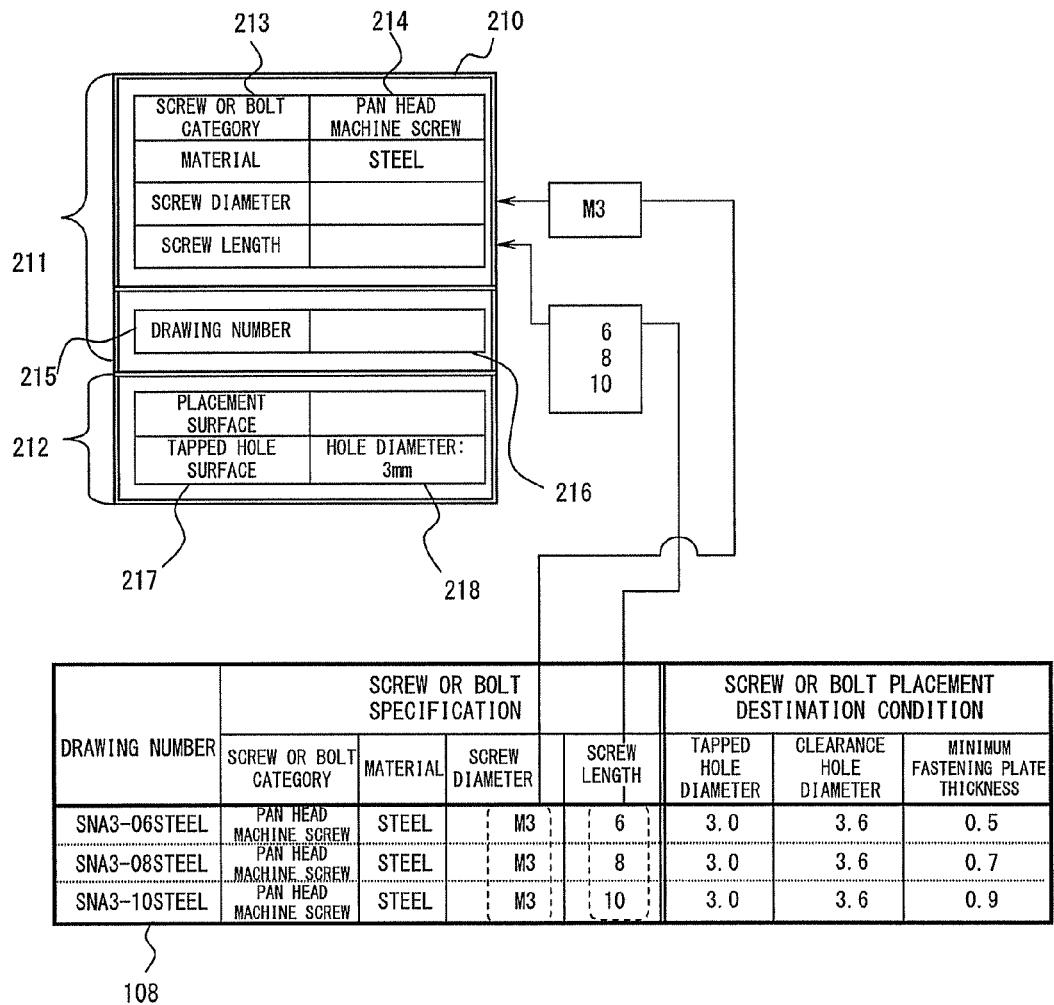
FIG. 12 is a diagram showing the relationship between the selectable choices in a screw- or bolt-use information input menu and a selectable model database.

FIG. 12 is a diagram showing the relationship between the selectable choices in the screw- or bolt-use information input menu 210 and the selectable model database 108, exemplifying the case of the selectable model database 108 being narrowed down as shown in FIG. 11B. The screw- or bolt-use information input menu 210 shown in FIG. 12 is similar to FIG. 9, except where the values are already selected for a part of the input section 214 and the information is already displayed in a part of the display section 218.

The screw- or bolt-use information input menu 210 is displayed by the selectable model specification display unit 109 in accordance with the content of the selectable model database 108.

The content of the selectable model database 108 shown in FIG. 12 is the same as that of FIG. 11B. Looking at the selectable model database 108, all of the three records show the value of the "screw diameter" being "M3". Therefore, the selectable choice as "screw diameter" is only "M3" in this state. The present embodiment accordingly is in automatically designating "M3" as the "screw diameter". The automatic designation is carried out by the selectable model selection unit 107 and selectable model specification display unit 109. Meanwhile, the values of "screw length" are respectively different in the three records and therefore the selectable choices as the "screw length" in this state are three kinds, i.e., "6", "8" and "10".

Therefore, if the user interface for the input section 214 is a list box, the list box of "screw diameter" displays only "M3" with the indication that the "M3" is already selected; and three values, i.e., "6", "8" and "10", are displayed in the list box of the "screw length". Likewise, there are only three selectable choices as "drawing number" and therefore the designation of a model by way of the drawing number is also easy. The user designates "screw length" or "drawing number", thereby making it possible to narrow down the models to one and to determine it.

Note that, in FIG. 12, the following is a description, in detail, of the process resulting in "M3" being automatically designated as "screw diameter".

If the value which an item B can possibly take is uniquely limited to a value X as a result of the value of an item A or the placement destination of a component being designated, the selectable model selection unit 107 performs the operation of narrowing down the selectable model database 108 by designating the value X to the item B. This operation does not cause the number of records of the selectable model database 108 to change.

In the example of FIG. 11A, if the user designates a tapped hole of which the tapped hole diameter is 3.0 mm, the selectable model database 108 is narrowed down to only the records in which the value of "tapped hole diameter" is "3.0". Here, as it is clear from FIG. 11A, all records in which the value of "tapped hole diameter" is "3.0" have the value of "screw diameter" being "M3". That is, the designation of a tapped hole, that is, the placement destination of the component, uniquely determines a value which the item "screw diameter" can possibly take.

Then the selectable model selection unit 107 automatically performs the operation for narrowing down the selectable model database 108 under the condition of the value of "screw diameter" being "M3". The selectable model specification display unit 109 then updates the screw- or bolt-use information input menu 210 so that the "M3" is selected as "screw diameter" in the model specification/drawing number designation section 211.

Figure 13:
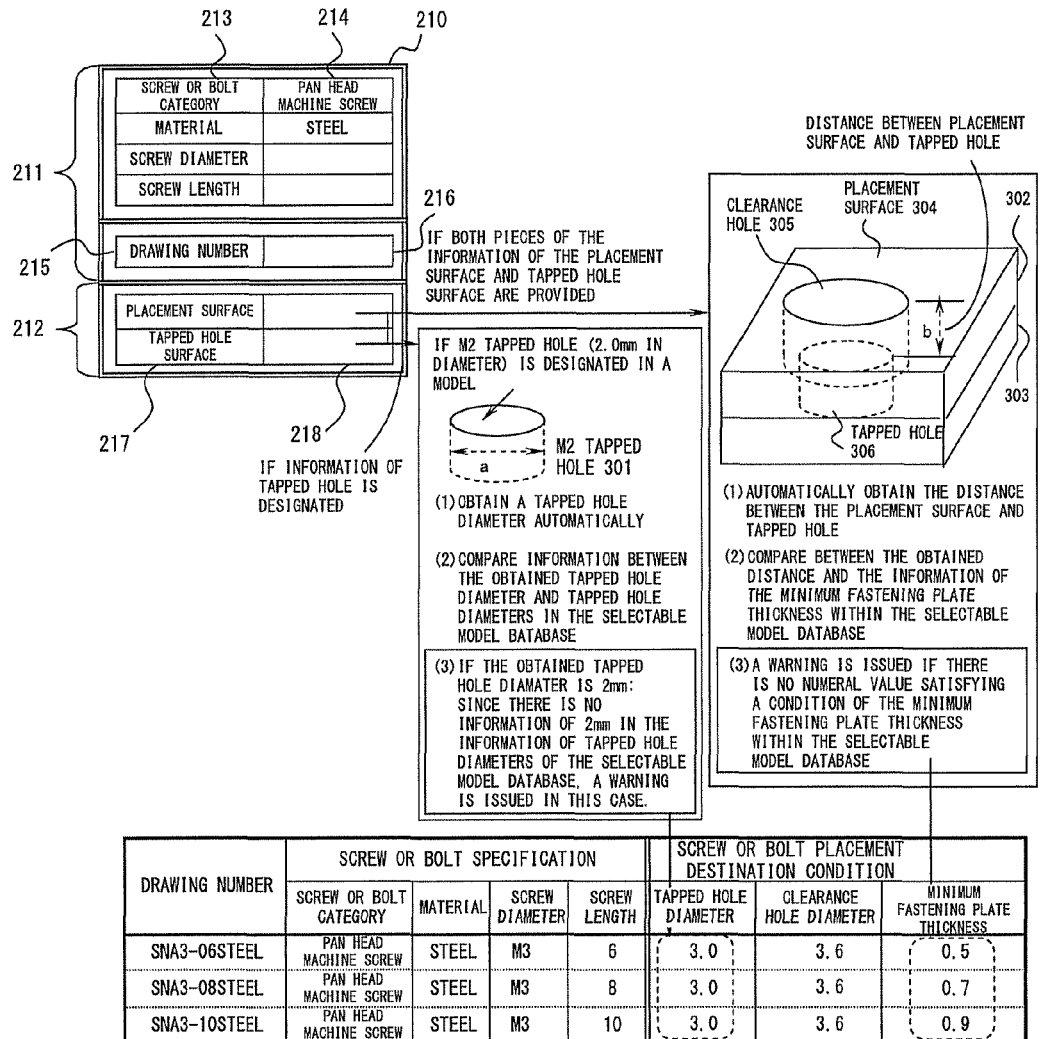
FIG. 13 is a diagram describing the operation, in detail, of a placement information check unit.

Next is a description of the operation of the placement information check unit 110 in detail by referring to FIG. 13. The example of FIG. 13 is the case in which the database of FIG. 6 is stored in the library model database 102 and the designations of the "screw or bolt category" being "pan head machine screw", the "material" being "STEEL" and the "screw diameter" being "M3" are already designated by way of the input section 214 of the screw- or bolt-use information input menu 210. In this case, the selectable model database 108 is narrowed down to only three records as shown in the lower row of FIG. 13. The description here continues by exemplifying the case of the user designating a tapped hole surface and a placement surface sequentially starting from the above described state.

First, let it be assumed that the user designates the tapped hole surface of the tapped hole 301 of "M2" by using a mouse or the like. The "M2" is the sign indicating the tapped hole diameter being 2.0 mm. Then, the placement information designation unit 106 obtains the value of the tapped hole diameter on the basis of the data of the model of the tapped hole 301 of M2. The specific obtainment method is different depending on the data format of a model, that is, there is sometimes a case of being obtainable by simply reading the value of data, or there is sometimes a case requiring a certain calculation. The example of FIG. 13 represents the tapped hole diameter by the sign "a". The value "2.0" is obtained from the data of the model of the tapped hole 301 of M2. The placement information designation unit 106 reports that the value of the obtained tapped hole diameter is 2.0 to the selectable model selection unit 107. This report corresponds to the arrow traveling to the selectable model selection unit 107 from the placement information designation unit 106 in FIG. 4.

The placement information check unit 110 comprised by the selectable model selection unit 107 compares between the reported value of the tapped hole diameter and the values of "tapped hole diameter" in the respective records of the selectable model database 108. The event of the placement information check unit 110 referring to the selectable model database 108 for this comparison is represented by the arrow traveling to the placement information check unit 110 from the selectable model database 108 in FIG. 4.

In the example of FIG. 13, the values of "tapped hole diameter" of all three records are "3.0" and therefore the values between "2.0" and "3.0" are compared in the respective records. As a result, it becomes clear that there is no record in which the "tapped hole diameter" matches "2.0" in the selectable model database 108.

Here, a description, in general term, of the relationship among the designation of a tapped hole surface, the tapped hole diameter of the designated tapped hole surface and the item "tapped hole diameter" within the selectable model database 108 is as follows.

First, as described in association with FIG. 9, the information designating a tapped hole surface is a kind of the placement information representing a placement destination. Meanwhile, the item "tapped hole diameter" within the selectable model database 108 is the item representing the constraint condition related to the placement of a screw or a bolt. As FIG. 6 makes it clear, the item representing a constraint condition may be expressed by a permissible value per se, or by the maximum or minimum value of the permissible value. The tapped hole diameter of the designated tapped hole surface is one example of the value indicating the characteristic of the placement destination which is the spot represented by the placement information. That is, the characteristic of the placement destination is obtained from the placement information, the value indicating the characteristic and the value of the item representing the constraint condition are compared with each other, and whether or not the constraint condition is satisfied is judged on the basis of the comparison result.

Note that the characteristic of the placement destination is appropriately adopted, depending on the embodiment, from among various kinds, for example, as follows:

A length such as the tapped hole diameter and the depth of a tapped hole.
An area size such as the bottom area size of a tapped hole.
A kind of the feature of a placement destination, such as circle and hexagon.
A parameter expressing the form of a placement destination, such as radius of curvature.
The material of another component specified as the placement destination.

If an M2 tapped hole 301 is designated when only the three records shown in FIG. 13 exist in the selectable model database 108, and if the selectable model selection unit 107 further narrows down the selectable model database 108 in accordance with the designation, a record will no longer exist in the selectable model database 108. That is, the M2 tapped hole 301 is a spot impossible for the placement. In this case, it is therefore desirable that a narrow-down operation is not carried out and instead a warning is issued and the designation of the tapped hole surface of the M2 tapped hole 301 is cancelled, that is, it is desirable to cancel the designation.

Therefore, if the placement information check unit 110 judges that a spot impossible for a placement is designated as the placement destination, the selectable model selection unit 107 cancels the content designated by the placement information designation unit 106 on the basis of the judgment. That is, the designation of the M2 tapped hole 301 is cancelled in this example and therefore a narrow-down operation for extracting a record in which the "tapped hole diameter" matches "2.0" is not carried out. Then, the selectable model selection unit 107 issues a warning to report to the user that the designated placement information is not appropriate. Incidentally, the warning may be a visual warning displayed in a display screen, an auditory warning emitted from a speaker or the combination of them.

When the user then designates another appropriate tapped hole surface in accordance with the warning, the content of designating the tapped hole surface is established and the information on the established tapped hole surface is displayed in the display section 218 of the placement information designation section 212. In the example of FIG. 13, the user re-designating the tapped hole surface of an M3 tapped hole 306 in accordance with the warning causes the content of designating the tapped hole surface to be established and the information, for example, "3 mm hole diameter" and the like to be displayed in the display section 218.

Next is a description of the case of the user designating a placement surface after the tapped hole surface is established as described above. In the example of FIG. 13, the user is trying to place a screw for fastening the plate 302 having the bored clearance hole 305 to the plate 303 having the bored tapped hole 306. In this case, the placement destination of the screw is uniquely designated by the user further designating, as the placement surface 304 of the screw, the surface opposite to the surface contacting with the plate 303 among the surfaces of the plate 302.

As the user designates the placement surface 304 by using a mouse or such, the placement information designation unit 106 obtains the distance between the placement surface 304 and tapped hole 306. While the specific obtainment method is different for the specific format of the data of a model such as the model of the plate 302, the distance indicated by the sign "b" in FIG. 13 is obtained. Since the thickness of the plate 302 is constant in the example of FIG. 13, the distance b between the placement surface 304 and tapped hole 306 is equal to the thickness of the plate 302. The placement information designation unit 106 then reports the obtained distance b to the selectable model selection unit 107.

The placement information check unit 110 comprised by the selectable model selection unit 107 compares between the value of the reported distance b and the values of the "minimum fastening plate thickness" of the individual records in the selectable model database 108. In the example of FIG. 13, the values of the "minimum fastening plate thickness" of three records are "0.5", "0.7" and "0.9". The placement information check unit 110 judges that only the record(s), in which the value of the distance b is no smaller than the value of "minimum fastening plate thickness", satisfies (satisfy) the constraint condition. For example, if b=0.3, there is no record satisfying the constraint condition; if b=0.5, only the record in which the "drawing number" is "SNA3-06 STEEL" satisfies the constraint condition; and if b=1.0, all of the three records satisfy the constraint condition.

As such, the placement information check unit 110 checks whether or not the individual records of the selectable model database 108 satisfy the constraint condition. If it is judged that there is no record retaining a value satisfying the constraint condition related to the minimum fastening plate thickness as the value of the item "minimum fastening plate thickness" in the selectable model database 108 as a result of the check, the selectable model selection unit 107 issues a warning. This warning may also be the visual, auditory or the combination of the two.

Such a warning is issued when a record no longer exists in the selectable model database 108 if the selectable model selection unit 107 narrows down the selectable model database 108 in accordance with the designated placement surface 304. Accordingly, the selectable model selection unit 107 carries out no operation of narrow-down in this case of issuing the warning. Instead, the selectable model selection unit 107 cancels the designation of the placement surface 304.

In contrast, if one or more records satisfying the constraint condition related to the minimum fastening plate thickness exist in the selectable model database 108 as a result of the check, the selectable model selection unit 107 narrows down the selectable model database 108 on the basis of the information of which record satisfying the constraint condition.

Figure 14:
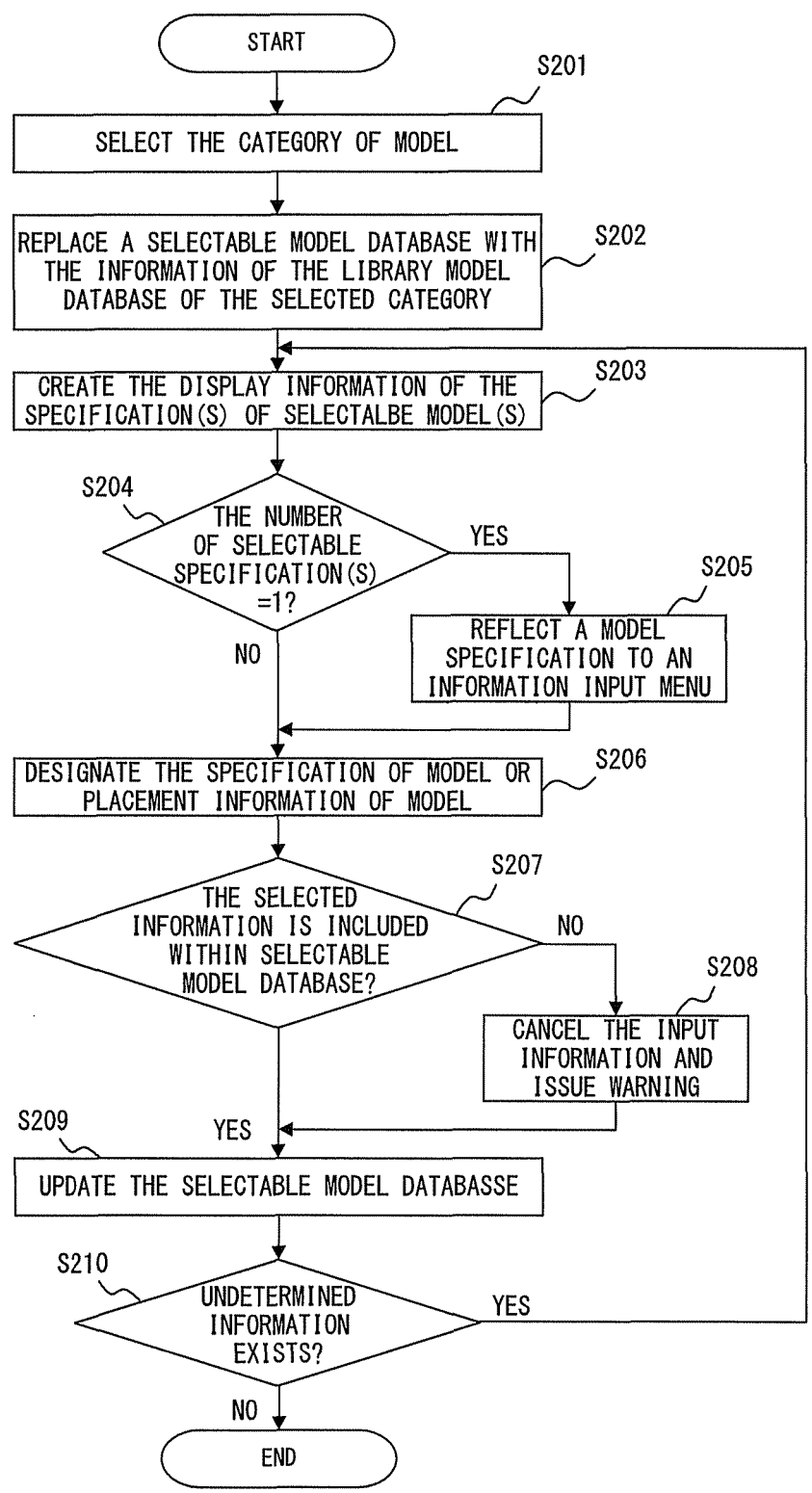
FIG. 14 is a flow chart showing the flow of selecting a model.

Next is a description of the flow of selecting the model described above by referring to FIG. 14. FIG. 14 is a flow chart showing, in greater detail, the part consisting of the steps S101 and S102 shown in FIG. 5. The steps S201 and S202 within FIG. 14 are parts not shown in FIG. 5; and the steps S203 through S209 of FIG. 14 correspond to the S101 of FIG. 5 and the S210 of FIG. 14 corresponds to the S102 of FIG. 5.

In S201, the selectable model specification display unit 109 displays the model category selection menu 200 of FIG. 8 in the display screen so that the user selects the category of a model by way of the model category selection menu 200. The model specification designation unit 105 designates the selection result to the selectable model selection unit 107.

Then in S202, selectable model selection unit 107 initializes the selectable model database 108. That is, the selectable model selection unit 107 replaces the selectable model database 108 with the information of the library model database 102 of the category selected by the user in the S201. For example, if "screw or bolt" is selected in the S201, the selectable model database 108 is replaced with the information of FIG. 6, or if "nut" is selected therein, the selectable model database 108 is replaced with the information of FIG. 7, and thereby the selectable model database 108 is initialized.

Following the S202, the steps S203 through S210 form a loop which is executed repeatedly until "no" is judged in the S210.

In S203, the selectable model specification display unit 109 creates the display information of the specification(s) of selectable model(s). That is, the selectable model specification display unit 109 reads data from the selectable model database 108 and creates the information for displaying in the information input menu such as FIGS. 9 and 10, specifically the information for displaying as heading and choices on the basis of the read content.

Then in S204, the selectable model specification display unit 109 judges whether or not there is an item in which the number of selectable specification is "1", that is, an item in which a selectable choice is limited to one. If there is such an item, the judgment is "yes" and the process proceeds to S205, while if there is no such item, the process proceeds to S206. For example, only the specification of the value "M3" is selectable as choice in the item "screw diameter" in the example of FIG. 12 and therefore the judgment of FIG. 12 is "yes" in the S204.

In S205, for the item judged in the S204 that selectable choice is limited to one, the selectable model specification display unit 109 reflects the only one choice to the information input menu and display the information input menu with the only one choice being selected in the item. As an example, if a list box formatted to display a selected choice in a reverse (or highlighted) display is employed as the user interface for the input section 214 of FIG. 12, the selectable model specification display unit 109 displays the choice of the value "M3" of the item "screw diameter" being selected, i.e., displays the choice of the value "M3" in reverse.

If there are plural items having been judged in the S204, the items in which there is only one selectable choice, the selectable model specification display unit 109 reflects only one selectable specification to the information input menu for each of these plural items.

After processing in S205, or if the judgment of S204 is "no", the S206 is carried out. In the S206, the model information designation unit 104 receives an input from the user designating the specification or the placement information of the model and designates the input content to the selectable model selection unit 107. When inputting the specification of the model, the user inputs it by way of the information input menu. While the method for inputting the placement information of a model is discretionary; the user, by using a mouse or the like, may designate, for example, a desired spot in the model of a design target displayed in the screen.

In S207, the placement information check unit 110 judges whether or not the information of the user-selected content is included in the selectable model database 108 in accordance with the content designated in the S206. The information of the user-selected content is specifically the record(s) related to model(s) matching a designated specification if the user has designated the specification in the immediately previous step S206. Or, the information of the user-selected content is specifically the record(s) related to the model(s) in which the relationship between the spot indicated by the designated placement information and the value(s) of individual item(s) included in the record satisfies the constraint condition if the user has designated the placement information in the immediately previous step S206.

If the information of the user-selected content is included in the selectable model database 108, the judgment is "yes" and the process proceeds to S209, while the information is not included therein, the judgment is "no" and the process proceeds to S208. In other words, what makes the judgment "no" is the case in which a record will no longer exist in the selectable model database 108 if it is narrowed down in accordance with the condition designated in the S206.

Therefore, in S208, the selectable model selection unit 107 cancels the information inputted in the S206 and issues a warning.

The S209 is carried out after the process of S208 or after the judgment is made as "yes" in the S207. In the S209, the selectable model selection unit 107 designates a narrow-down condition to the selectable model database 108, narrows it down and updates the selectable model database 108.

If the S209 is carried out after the judgment of "yes" is made in the S207, the number of records in the selectable model database 108 is reduced, but not to a zero, by the narrow-down operation in the S209.

In contrast, if the S209 is carried out after the judgment of "no" is made in the S207, the number of records in the selectable model database 108 remains the same as the number prior to the process of the S209, i.e., the number not being reduced. The reason is that the narrow-down condition designated by the selectable model selection unit 107 in the S209 is the same as the condition designated when the record set of the present selectable model database 108 has been created, because the S208 has been carried out prior to the S209.

Incidentally, the designation of a certain specification or placement information sometimes determines another specification uniquely in chain reaction. For example, the designation of a tapped hole with a 3.0 mm tapped hole diameter as the placement information results in limiting the "screw diameter" only to "M3" in chain reaction in the example of FIG. 11A.

The present embodiment is configured such that the selectable model selection unit 107 detects the item(s) of which the value is uniquely determined in chain reaction as described above in the S209. Then, if there are one or more such items, the selectable model selection unit 107 also designates the uniquely determined value as a narrow-down condition for each of these detected one or more items, when narrowing down the selectable model database 108.

For example, the selectable model database 108 in the state as shown in FIG. 11A is narrowed down in steps by repeating the loop consisting of the steps S203 through S210. As an example, let it consider the case in which the "pan head machine screw" is designated as "screw or bolt category" in the S206 for the first loop, the "STEEL" is designated as "material" in the S206 for the second loop and a tapped hole is designated in the S206 for the third loop.

In this case, the narrow-down condition:
["screw or bolt category"="pan head machine screw"]
is used in the S209 for the first loop. The narrow-down condition:
["screw or bolt category"="pan head machine screw" AND "material"="STEEL"]
is used in the S209 for the second loop. Boolean "AND" operator is hereinafter expressed as "AND" in capital letters. The narrow-down condition:
["screw or bolt category"="pan head machine screw" AND "material"="STEEL" AND "tapped hole diameter"="3.0"]
is used in the S209 for the third loop. Then, the selectable model database 108 is as shown in FIG. 11B as a result. FIG. 11B indicates that the value of the item "screw diameter" which has not yet directly designated by the user is limited only to "M3". Then, in the S209 for the third loop, the selectable model selection unit 107 detects that the value of the "screw diameter" is thusly uniquely determined in chain reaction, and narrows down the selectable model database 108 again by using the narrow-down condition:
["screw or bolt category"="pan head machine screw" AND "material"="STEEL" AND "tapped hole diameter"="3.0" AND "screw diameter"="M3"]

That is, the present embodiment is configured to carry out two times of narrow-down in the S209 for the third loop. In the second narrow-down, while there is no influence to the number of records of the selectable model database 108, all the items of which the value has been uniquely determined are included in the second narrow-down condition.

When the selectable model database 108 has been updated in the S209 as described above, the process proceeds to S210. Then, whether or not there is undetermined information, among the specifications and the pieces of the placement information of models, is judged in the S210.

Here, the "undetermined information" is a little different from the information which has not yet been designated by the user. The reason is that there is an item of which the value is uniquely determined in chain reaction on the basis of another specification or placement information even if the user has not directly designated as described above. That is, the information which is not directly designated by the user and which is not determined from the information designated by the user in chain reaction, that is, indirectly, is the "undetermined information".

If there is yet the undermined information, the process returns to the S203, while if all pieces of information have been determined, the process of FIG. 14 ends.

As such, the present embodiment is configured to automatically select only model(s) satisfying the constraint condition related to the placement in the process of selecting a model to be loaded and placed. In the case of utilizing the conventional 3D-CAD system 1002 of FIG. 1, the user is required to pre-confirm the diameter of a screw hole and to pre-investigate the specification of a screw matching the screw hole, both through manual works, enduring a considerable effort. The embodiment shown in FIG. 14 significantly reduces the effort.

Further, the embodiment shown in FIG. 14 has greater advantage than the invention noted in the reference patent document 1. In the invention of the patent document 1, the producibility (i.e., the validity of manufacturing characteristics) is judged after determining the arrangement positions of the respective components. If a certain component and a certain spot is in a relationship which does not satisfy the constraint condition related to the arrangement (i.e., placement) of the component, the method of judging that the constraint condition is not satisfied after the arrangement positions of all components have been determined may cause an extraneous rework to occur because the timing of the judgment is late. In contrast, the embodiment of the present invention shown in FIG. 14 prevents such a delay in the timing of judgment.

Figure 15:
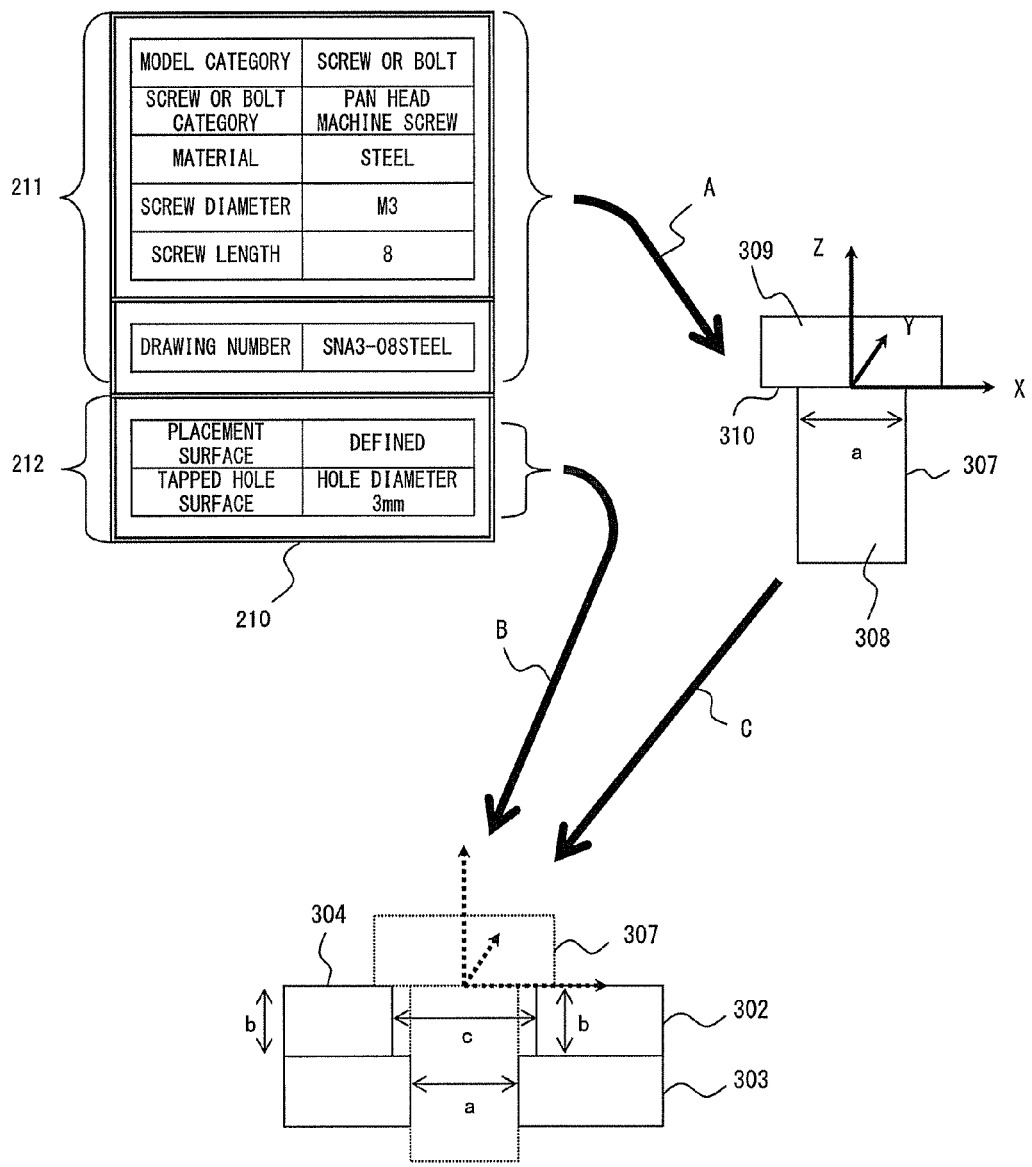
FIG. 15 is a diagram describing the operations of a model data load unit and of a model placement unit.

Next is a description of the operations of the model data load unit 111 and model placement unit 112 in detail by referring to FIG. 15. The procedure described in connection with FIG. 14 is the procedure for determining the model of a component to be used uniquely and also determining a placement destination between which the unique model is in the relationship satisfying the constraint condition. Accordingly in an actual design, what are required next are the procedures for loading the model of the component onto the 3D-CAD system 103 from the library 101 and for actually placing the model in the placement destination. The specific procedures are the step S103 of FIG. 5 carried out by the model data load unit 111 and the S104 of FIG. 5 carried out by the model placement unit 112.

FIG. 15 also exemplifies the case of "screw or bolt" being selected as a category and therefore the information input menu displayed in the display screen is also the screw- or bolt-use information input menu 210. In FIG. 15, all items are already designated including "drawing number". As described above, the "drawing number" according to the present embodiment is the identification information identifying a model. Therefore, the screw- or bolt-use information input menu 210 of FIG. 15 corresponds to the selectable model database 108 having been narrowed down to one record.

The model specification designation unit 105 designates the selected value of "drawing number" to the model data load unit 111. This designation corresponds to the arrow traveling to the model data load unit 111 from the model specification designation unit 105 which are shown in FIG. 4.

The model data load unit 111 refers to the library 101 by using the value of "drawing number" and reads the data of a model corresponding to the "drawing number" from the library 101 out to the 3D-CAD system 103. The reference and readout correspond to the two arrows connecting the library 101 and model data load unit 111 which are shown in FIG. 4. If, for example, the library 101 is stored in a hard disk drive, the model data load unit 111 loads the data of the model designated by the "drawing number" onto an area in the RAM for use in the 3D-CAD system 103 from the hard disk drive.

The arrow A of FIG. 15 schematically illustrates that the model of the screw 307 is uniquely determined by items included in the model specification/drawing number designation section 211 among items shown in the screw- or bolt-use information input menu 210 and that the determined model is loaded.

Further, the model data load unit 111 reports the category and placement information of the loaded model to the model placement unit 112, and also issues an instruction to the model placement unit 112 so as to place the loaded model. This instruction corresponds to the arrow traveling to the model placement unit 112 from the model data load unit 111 as shown in FIG. 4. The placement information indicating the position at which the model is to be placed is given to the model placement unit 112 by the placement information designation unit 106. This procedure corresponds to the arrow traveling to the model placement unit 112 from the placement information designation unit 106 which are shown in FIG. 4. The model placement unit 112 places the loaded model at the position indicated by the placement information in the appropriate orientation on the basis of the instruction from the model data load unit 111 and the placement information from the placement information designation unit 106.

The arrow B shown in FIG. 15 schematically illustrates that the placement destination of the screw 307, that is, more precisely the position and orientation of placing the screw 307, is determined by the items indicated in the placement information designation section 212, among the items shown in the screw- or bolt-use information input menu 210. The placement destination of the screw 307 is determined by both the tapped hole surface of the tapped hole bored in the plate 303 for fastening the plate 302 onto the plate 303 and the placement surface 304 which is the top surface of the plate 302 in which the clearance hole is bored. The plates 302 and 303 are parts of a design target.

Meanwhile, the arrow C schematically illustrates that the model of the screw 307 is placed at the determined position in the determined orientation. Specifically, the screw 307 is placed so that the shank 308 penetrates the plates 302 and 303, and so that the bearing surface 310 of the head 309 contacts with the placement surface 304 of the plate 302.

The specific conditions such as "the bearing surface 310 contacts with the placement surface 304" related to the placement are predetermined by the category of the model to be placed being "screw or bolt". Therefore, the detailed position and orientation with which the model of an individual specific screw is to be placed are uniquely determined merely by designating the tapped hole surface and placement surface.

Note that the signs "a", "b" and "c" which are shown in FIG. 15 are a tapped hole diameter, the distance between the placement surface 304 and tapped hole, and a clearance hole diameter, respectively. The tapped hole diameter is the same as the screw diameter of the screw 307, and the distance between the placement surface 304 and tapped hole is the same as the thickness of the plate 302.

Next is a description of two embodiments related to the operations of the model data load unit 111 and model placement unit 112 in detail. Note that the following description is provided by assuming that a design target is represented by the xyz coordinate system, with a set of coordinates being expressed by a row vector (x, y, z).

The first is an embodiment applied to a 3D-CAD system of the mechanism in which a model is loaded to the same coordinates as the coordinates at which the model was positioned when the data of the model was stored in the library. In this case, the provider of the library 101 predetermines one set of coordinates for each category of a model and stores the model in the library 101 in the state of the model being positioned at the predetermined coordinates.

For example, a set of coordinates (x1, y1, z1) is predetermined for the model of the category "screw or bolt", where each of the x1, y1 and z1 is a constant. Whenever creating the model of a screw, the provider of the library 101 first adjusts the model so that it is positioned at the coordinates (x1, y1, z1) and then stores the model in the library 101.

This practice enables the model to be positioned at the coordinates (x1, y1, z1) without fail when the model data load unit 111 loads the model of the screw onto the 3D-CAD system 103. Therefore, the model placement unit 112 simply moves the model positioned at the coordinates (x1, y1, z1) to the spot designated by the placement information designation unit 106 and rotates the model as appropriate in order to place the component of which the category is "screw or bolt".

The second embodiment related to the model data load unit 111 and model placement unit 112 is configured to utilize a model provided with a local coordinate system having the origin at the predetermined position of a model.

In the example of FIG. 15, the model of the screw 307 is provided with the XYZ coordinate system in which the Z axis is the central axis of the screw 307 and the origin is at the intersection point between the Z axis and the plane on which the head 309 and shank 308 contact each other. FIG. 15 establishes the axis going from the left to right as X axis and the axis going from the near side of the drawing to the far side as Y axis.

The second embodiment is configured to provide all the models of the category "screw or bolt" with a local coordinate system so that the central axis of the screw or bolt is Z axis and the bearing surface is the XY plane. Also for the models of other categories, the method for providing with the coordinate system is appropriately predetermined in consideration of the features such as the form and assembly orientations for the respective categories.

Having loaded the data of a model, the model data load unit 111 reads the information related to the coordinate system of the model from the loaded data, and thereby the model data load unit 111 grasps the relationship between the global xyz coordinate system representing a design target and the position of the origin and the direction of each axis of the local XYZ coordinate system which is provided to the loaded model. The model data load unit 111 reports the grasped relationship to the model placement unit 112. The model placement unit 112 calculates the movement direction, movement distance, rotation direction and rotation amount for placing the model at the spot designated by the placement information designation unit 106 in the designated orientation on the basis of the relationship reported by the model data load unit 111 and places the model in the placement destination by moving and rotating the model.

In either of the first and second embodiment described above, the model is automatically placed at the spot indicated by the placement information in the appropriate orientation without requiring any operation of the user after the model and placement information are uniquely determined. Such an automatic placement is where the first and second embodiments described above are superior to the conventional system.

In the conventional 3D-CAD system 1002 as shown in FIG. 1, the model data load unit 1003 is not in cooperation with the model placement unit 1004 and therefore the latter does not grasp the position where a model is loaded even if the model data load unit 1003 loads the model of a component.

Accordingly, the user used to be required to provide the 3D-CAD system 1002 with two commands, that is, a load command for loading a model and a placement command for placing the component in order to reflect the model of a necessary component to the model of a design target. That is, the user has conventionally carried out cumbersome operations as follows, and the cumbersomeness has not been solved even by the inventions noted in the patent documents 1 and 2.

First, the user gives a load command to the model data load unit 1003, thereby causing it to load the model of a component once onto the 3D-CAD system 1002. The user then confirms, in a display screen, the spot where the model is loaded and then gives a placement command to the 3D-CAD system 1002. In this event, the user is required to designate the model of the component, thereby designating the information of the position where the model of the component is loaded, and also is required to designate the information of the spot where the model of the component is to be placed and the orientation with which the model is to be placed.

Furthermore, the conventional 3D-CAD system 1002 does not grasp the category of the model of an individual component. The user is accordingly required to designate apiece(s) of detailed information such as "the bearing surface of a screw contacts with the placement surface" whenever issuing a placement command and also to check whether or not the relationship between a screw hole and a screw satisfies the constraint condition related to the placement by enduring an effort.

In contrast, the embodiments of the present invention described above bring forth benefits as follows. First, since the category of a model is already identified in the process of determining the model to be one, the model placement unit 112 is enabled to place the model appropriately in accordance with the category of the model without requiring the user to designate the position and orientation of the model in detail. Furthermore, since only the model satisfying the constraint condition related to the placement is selected, the user is not required to investigate each tapped hole diameter, or such, manually. The reason for gaining such a benefit is that both the specification of a model and the constraint condition related to the placement are stored in the library model database 102 so that both of them are taken into consideration in narrowing down the models.

Therefore, the model data load unit 111 and model placement unit 112 are capable of automatically carry out the loading to the placement by cooperating each other, while the user is not required to designate either a load command or placement command along with the necessary information for the commands as in the conventional system. As a result, the design time is shortened by eliminating the work of the user, a timely and automatic check as to whether the design satisfies the constraint condition while the design is proceeding is enabled, and accordingly a mistake in the design associated with a manual work is eliminated.

Next is a description of the process for adding the model of a component to the library 101 by referring to FIG. 16. The addition of a model to the library 101 is generally carried out by a component designer providing the library 101, although it may be carried out by the designer of a design target.

In S301, the component designer determines a target component to add to the library 101. Then, the process A consisting of the steps S302 through S305 and the process B consisting of the steps S306 through S313 are carried out, respectively. The process A and process B may be carried out parallelly or the process B may be carried out after the process A, or vice versa.

The process A is for adding data to the library 101. The component designer obtains the configuration information of the target component in S302, where the configuration information indicates the form of the target component, and creates the 3D model of the target component by utilizing a suitable 3D-CAD system in S303. Further, the component designer provides the 3D model of the target component with the information of the origin (noted as "origin information" hereinafter) representing the local coordinate system of the model, as appropriate for the embodiment, in S304. Then, the component designer stores the data of the 3D model of the target component in the library 101 in S305.

The process B is for adding the data to the library model database 102 and for changing a part of the 3D-CAD system 103. The component designer discerns the category of a target component, that is, the category of a model to be added to the library 101, in S306, and judges whether or not the discerned category is a new category in S307. The new category means the category not existing in the existing database within the library model database 102. For example, if there is only database of FIG. 6 in the library model database 102, a judgment is a new category if the target component is a nut, while the judgment is not a new category if the target component is a screw.

If the judgment is a new category in the S307, the component designer carries out the steps S308 through S312 followed by S313, while if the judgment in S307 is not a new category, the process proceeds to the S313.

In S308, the component designer determines a specification to be registered in the library model database 102. For example, if the target component is a nut, the component designer determines that the items, i.e., "nut category", "material" and "diameter of internal thread", are to be registered as the specification in the library model database 102.

Then in S309, the component designer determines, for the new category of a model, the method for designating the placement information of a model and the items for checking the placement information. For example, if the target component is a nut, the component designer determines that the pieces of information to be designated as the placement information of the nut are the information designating the thread surface of the bolt to be combined with the nut and the information designating the placement surface, which is a surface contact with the nut, of a member fastened with the bolt. Furthermore, the component designer determines that the two items, i.e., "screw diameter" and "necessary screw length", as the items for checking the placement information are to be provided in the library model database 102.

Then in S310, the component designer creates a data format for the new category of a model. The component designer determines the data format, such as the data format of "necessary screw length" being a numeral value, in the example where the target component is a nut.

Then in S311, the component designer creates a specification selection menu used for the new category of a model and adds the menu to the 3D-CAD system 103. The S311 specifically corresponds to, for example, adding a subroutine to the program for making a computer function as the selectable model specification display unit 109. The subroutine is for displaying a menu as shown in FIG. 10 in the display screen, in the example where the target component is a nut.

Subsequently in S312, the component designer creates and adds the function for placing a model and the function for checking placement information which are used for the new category of a model. In specific, the process of the S312 corresponds to, for example, adding subroutines respectively to the programs for making a computer function as the model placement unit 112 and placement information check unit 110. In the example where the target component is a nut, a subroutine added to the program used for the model placement unit 112 includes the steps as follows:

The step for detecting the central axis of a bolt on the basis of the thread surface designated by the placement information; and The step for placing the nut so that the detected central axis and the central axis of the nut are aligned and so that the surface of the nut contacts with the placement surface designated by the placement information.

Further, a subroutine added to the program used for the placement information check unit 110 includes the steps as follows:

The step for calculating the screw diameter of a bolt having the thread surface designated as the placement destination of the nut and the length of engagement between the bolt and nut on the basis of the models of the bolt and nut;

The step for reading the values of "screw diameter" and "necessary screw length" as the constraint condition from the selectable model database 108; and The step for judging whether or not the calculated screw diameter of the bolt is equal to the read screw diameter and whether or not the calculated length of engagement is no less than the read necessary screw length.

Then in S313, that is, at the end of the process B, the component designer registers the various kinds of information related to the target component determined in the S301 in the library model database 102 which includes databases for each category of model. That is, the component designer registers, in the library model database 102, the data of the individual items as shown in FIG. 7 as an example.

As such, the library 101, library model database 102 and 3D-CAD system 103 are appropriately updated.

Figure 17:
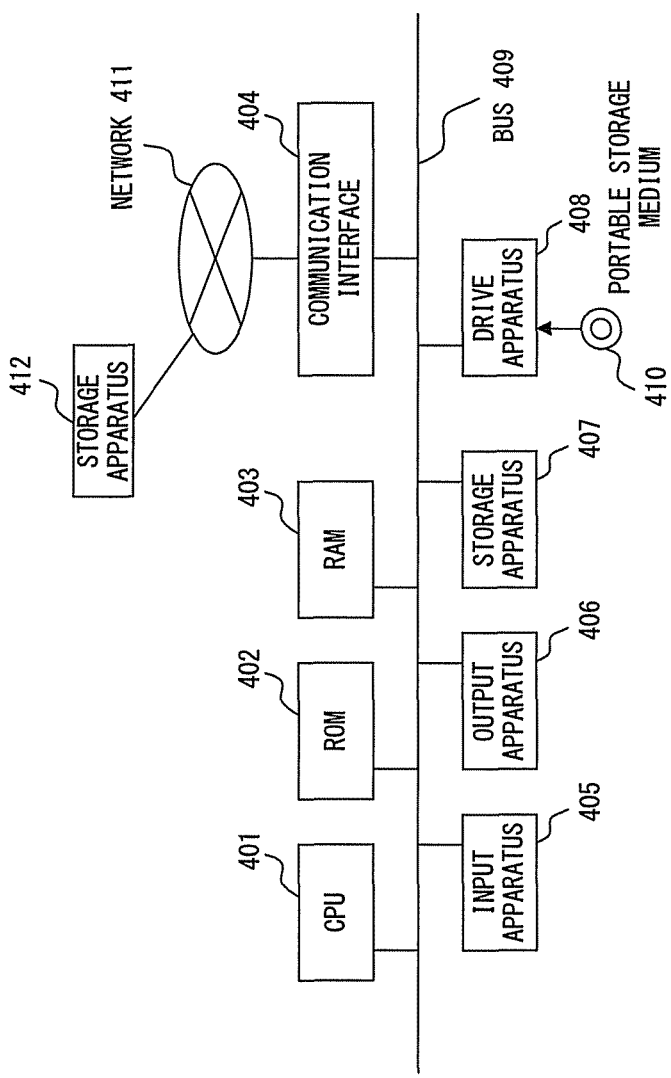
FIG. 17 is the block diagram of a computer executing a program according to an embodiment of the present invention.

FIG. 17 is a block diagram of a computer executing a program according to any of the above-described embodiments of the present invention. The computer shown in FIG. 17 comprises a central processing unit (CPU) 401, read only memory (ROM) 402, RAM 403, a communication interface 404, an input apparatus 405, an output apparatus 406, a storage apparatus 407 and a drive apparatus 408 for a portable storage medium 410, with a bus 409 interconnecting all of them.

Further, the computer shown in FIG. 17 is connected to a network 411 by way of the communication interface 404. The network 411 may be an arbitrary network such as a local area network (LAN) and the Internet. The computer may be configured to refer to another storage apparatus 412 by way of the network 411.

The input apparatus 405 is, for example, a pointing device, such as a mouse and a touch pen, and a keyboard. The user carries out an input to menus such as the model category selection menu 200, an input of placement information by way of the input apparatus 405. The output apparatus 406 is a display apparatus such as a liquid crystal display. The output apparatus 406 displays the model of a design target and that of a component, menus such as the model category selection menu 200, a warning in the case of a record matching the constraint condition not existing, and such.

The storage apparatuses 407 and 412 may be a magnetic disk apparatus such as a hard disk drive, or may be another kind of storage apparatus. The storage apparatus 407 or ROM 402 stores a program according to the embodiment of the present invention. The CPU 401 executing the program carries out the processes shown in FIGS. 5 and 14. The library 101 and library model database 102 are stored in the storage apparatus 407, portable storage medium 410 or storage apparatus 412.

The steps S203 and S209 of FIG. 14 need to refer to the selectable model database 108. Therefore, a configuration storing the selectable model database 108 in the storage apparatus 412, or the like, which takes the CPU 401 a long period of time to refer to is not preferable in terms of a high speed process and of reducing the wait time of the user. That is, it is preferable to store the selectable model database 108 in the RAM 403 enabling a higher speed reference for the CPU 401 than in the storage apparatus 407 etc. The RAM 403 and storage apparatus 407, however, may be used in combination to store the selectable model database 108 depending on the data volume of the selectable model database 108.

The program according to the embodiment of the present invention may be stored in the storage apparatus 412 by a program provider, provided by way of the network 411 and communication interface 404, stored in the storage apparatus 407 and executed by the CPU 401. Alternatively, the program according to the embodiment of the present invention is stored in the portable storage medium 410, it is set in the drive apparatus 408, so that the stored program is loaded onto the RAM 403 and executed by the CPU 401. The portable storage medium 410 can employ various forms of storage media such as a magneto optical disk, a flexible disk and an optical disk, including a compact disk (CD) and a digital versatile disk (DVD).

The embodiments described above provide the benefit of greatly reducing man-hours required for design, especially the benefit of shortening the design time greatly in various aspects. The present invention, however, is in no way limited by the embodiments described above and, instead, allows various modifications. The following describes a few of such examples.

FIGS. 6 and 7 delineate the data structure of the library model database 102 in a table format; the format of the library model database 102 is discretionary and it may be, for example, an extensible markup language (XML) database, or such. When implementing the library model database 102 by using a table, such a table need to be separately provided for each category because the items required for expressing the specification and constraint condition are generally different for each category of component. The library model database 102 is accordingly configured as an aggregate of the database of individual category. Meanwhile, when the library model database 102 is implemented by the XML database, the library model database 102 can also be constituted by the pieces of data related to different categories being mixed therein. Incidentally, the format of the selectable model database 108 is also discretionary as the library model database 102 is.

Further, the styles of the various menus shown in FIGS. 8, 9 and 10 are merely examples. The user interfaces for the various menus are discretionary. For example, if the user interface for the input section 214 shown in FIG. 9 is a list box, only the selectable choices are displayed; if it is a text box or combo box, however, the user is enabled to input an arbitrary value.

However, it is of course not possible to adopt all the input of arbitrary values as a narrow-down condition in the case of employing a combo box as the user interface. For example, the model specification designation unit 105 designates the value, which is freely input by the user, to the selectable model selection unit 107; the placement information check unit 110 comprised by the selectable model selection unit 107 checks whether or not the input value is applicable to a selectable choice, and, if the value is judged to be not applicable to a selectable choice, the selectable model selection unit 107 issues a warning and cancels the input content. As such, a necessary check function is different dependent on the adopted user interface.

There is sometimes no need to select a category by way of the menu as shown in FIG. 8 depending on the embodiment. The examples include the case in which there is only one category of component and the case in which a specification is defined by the same set of items for a plurality of categories. In these cases, a specification can be designated by way of an information input menu as shown in FIGS. 9 and 10 without a need to select a category first.

The items shown in FIGS. 6 and 7 are merely examples. An item(s) in addition to the examples may be utilized, or a part of items exemplified may not be utilized. Further, an item for expressing the constraint condition related to the placement may be an item not expressed by a numeral value and instead an item expressed by a sign, such as the item "material".

Further, there may be the case in which not all items of the library model database 102 shown in FIG. 6 or FIG. 7 are necessarily be utilized, or in which not all items of the information input menu shown in FIG. 9 or FIG. 10 are necessarily designated. The example includes the case in which the sequence of placing the models of a plurality of components in the model of a design target is discretionary. For example, a nut is used in combination with a bolt, in which case the sequence of placing the models of the nut and bolt is sometimes discretionary in designing utilizing the 3D-CAD system 103.

If the bolt is already placed first, the placement information check unit 110 checks whether or not the bolt and a nut satisfy the "nut placement destination condition" of FIG. 7 when the placement information designation unit 106 designates the placement information of the spot where the nut is to be placed with the bolt already placed. Also in this case, the placement destinations of the bolt and nut can be designated by the respective items shown in FIGS. 9 and 10.

In the meantime, if the nut is already placed first, it is necessary for the placement information check unit 110 to check whether or not the constraint condition related to the placement of the bolt when the placement information designation unit 106 designates the placement information of the spot where the bolt is to be placed with the nut already placed. Although there is no item indicating the relationship with a nut in FIG. 6, it is desirable to add, to FIG. 6, an item(s) defining the constraint condition related to the placement based on the relationship with the nut in an embodiment allowing the bolt to be placed after the nut is placed.

Also in this case, the placement destination of the bolt can also be designated by the combination between, for example, the placement surface and nut, in place of the combination between the "placement surface" and "tapped hole surface" which are shown in FIG. 9. In contrast, the placement destination of the nut cannot be designated by using "thread surface" of FIG. 10 because the bolt to be combined with the nut is not yet placed. Therefore, the placement destination of the nut needs to be designated by using an item(s) different from the items shown in FIG. 10, such as the combination between the tapped hole surface of the tapped hole in which the bolt is to be placed and the placement surface of the nut.

Therefore, if the sequence in which either model of nut or bolt is first to be placed is discretionary, for example, an item specifying the relationship with the nut is added to "screw or bolt placement destination condition" of FIG. 6, an item designating the nut is added to the placement information designation section 212 of FIG. 9, and an item designating a tapped hole surface is added to the placement information designation section 222 of FIG. 10. These added items, however, are not used when the bolt is placed first. Likewise, the "thread surface" of FIG. 10 is not used when the nut is placed first.

As described above, if the sequence of placing the models of plural components in the model of a design target is discretionary, the number of items in the library model database 102 or in the information input menu may sometimes be increased so that any sequence may be accepted. This may result in only a part of items being used while the other part thereof not being used when the components are placed in a specific sequence.

Further, an item representing a specification may be referred to when checking whether or not the constraint condition of a placement destination is satisfied. As an example, the "screw length" of FIG. 6 is an item representing the specification of a screw. A configuration may be such that a constraint condition based on the comparison between the sum of the depths of the tapped hole and clearance hole and the value of "screw length" is predefined as the constraint condition of a placement destination, in addition to the constraint conditions described above, and then the placement information check unit 110 refers to the value of the "screw length" in order to judge the constraint condition.

Further, in an embodiment in which the data of the model of individual component loaded onto the 3D-CAD system 103 is managed in the data of the model of a design target of the 3D-CAD system 103 along with the drawing number, the placement information designation unit 106 or placement information check unit 110 may be configured to operate as follows.

When the user designates, for example, the thread surface of a bolt as the placement information of a nut in a display screen, the placement information designation unit 106 obtains the drawing number of the bolt from the data of the model of the design target. The placement information designation unit 106 searches the library model database 102 with the obtained drawing number as a search key, obtains the specification of the bolt and reads the value(s) of the items related to the placement of the nut, such as the screw diameter of the bolt, from the obtained specification. Then the placement information designation unit 106 reports the read value(s) to the selectable model selection unit 107, and then the placement information check unit 110 comprised by the selectable model selection unit 107 judges whether or not the bolt and nut are in a relationship satisfying the constraint condition on the basis of the reported value(s).

Alternatively, the placement information designation unit 106 reports the drawing number of the bolt to the selectable model selection unit 107 which in turn obtains the specification of the bolt by searching the library model database 102 with the drawing number as a search key.

Contrarily, there may be an embodiment in which the 3D-CAD system 103 does not manage the drawing number of a model once loaded onto the 3D-CAD system 103. Also in such a case, the placement information designation unit 106 is enabled to calculate a tapped hole diameter, and such, on the basis of a 3D geometry data representing a model.

What is claimed is:

1. A non-transitory computer readable storage medium storing a program that causes a computer to execute a process, the process comprising:
designating, by the computer, a category of a component whose three-dimensional model is to be selected from a library that stores three-dimensional models of plural components and that correlates each three-dimensional model with identification information of each component, wherein the category to be designated is one of a plurality of categories including a first category and a second category for use in combination with each other;

initializing, by the computer, a first database by including records of components of the designated category into the first database, wherein
  each record included in the first database stores the identification information, values of plural specification items, and values of plural constraint items,
  each of the plural specification items represents a specification of the component,
  each of the plural constraint items represents a constraint condition under which a three-dimensional model of the component is permitted to be placed,
  the plural specification items and the plural constraint items are predetermined in accordance with the designated category,
  the plural constraint items predetermined in accordance with the first category include a first item and a second item,
  the first item of each individual record of each individual component of the first category represents, as the constraint condition for the individual component of the first category, a specification of a counterpart component of the second category permitted to be used in combination with the individual component of the first category, and
  the second item of each individual record of each individual component of the first category represents the constraint condition that is other than the specification of the counterpart component of the second category;
displaying by the computer, in a screen of a three-dimensional computer aided design system that is implemented by the computer, a menu for designating a value of each of the plural specification items representing the specification of the component of the designated category;
performing, by the computer, a first selecting operation of narrowing down the first database according to one value designated for one item by way of the menu;
performing, by the computer, a first menu update that
  extracts, from the narrowed-down first database, one or more values taken by each undetermined item for which more than one values remain selectable in the menu and which is one of the plural specification items, and
  updates, for each undetermined item, one or more choices selectable by way of the menu according to the extracted one or more values;
receiving, by the computer, an input of placement information indicating a spot included in a three-dimensional model of an apparatus which is a design target of the three-dimensional computer aided design system;
obtaining by the computer, from the three-dimensional model of the apparatus, a characteristic of the spot indicated by the placement information;
judging, by the computer, whether or not the characteristic matches the constraint condition, wherein
  when the designated category is the first category and the received placement information indicates, as the spot, a certain component whose three-dimensional model has already been placed and whose category is the second category,
    the judging is performed for each remaining record of a component of the designated first category remaining in the first database, and
    a value of the first item of each remaining record is compared, in the judging, with a value indicating the characteristic to judge whether or not the characteristic matches the constraint condition represented by the first item, and
  when the designated category is the first category and the spot indicated by the received placement information is other than the certain component of the second category,
    the judging is performed for each remaining record of a component of the designated first category remaining in the first database, and
    a value of the second item of each remaining record is compared, in the judging, with a value indicating the characteristic to judge whether or not the characteristic matches the constraint condition represented by the second item;
repeating, by the computer, the first selecting operation and the first menu update for one time or more until the narrowed-down first database includes only one certain record for which the judging judges the characteristic matches the constraint condition;
loading, by the computer, the three-dimensional model of the component whose record is the one certain record from the library by designating the identification information; and
placing, by the computer, the loaded three-dimensional model of the component on the spot indicated by the placement information.

2. The storage medium according to claim 1, wherein an item of the plural specification items expresses at least one of a form of the component, a material of the component, a length of a predetermined part of the component, and an area size of the predetermined part of the component.

3. The storage medium according to claim 1, wherein the repeating includes
receiving an input of a value of the identification information and
narrowing down the first database to only one record whose identification information is the received value.

4. The storage medium according to claim 1, wherein
the placement information includes information designating a certain point, information designating another different component already included in the apparatus, or information designating a certain part of the apparatus or of the different component, and
the certain part is a surface, a boundary between surfaces, an end, an edge, a convex part, a concave part or a through hole.

5. The storage medium according to claim 1, wherein
the three-dimensional model of the component is stored in the library by being correlated with a predetermined set of coordinates, wherein
the three-dimensional model of the component is loaded onto a spot of the predetermined set of coordinates in the loading, and
the three-dimensional model of the component is moved from the predetermined set of coordinates to the spot indicated by the placement information in the placing.

6. The storage medium according to claim 1, wherein
a set of coordinates of a spot where the three-dimensional model of the component is loaded in the loading is detected and the three-dimensional model of the component is moved from the detected set of coordinates to the spot indicated by the placement information in the placing.

7. The storage medium according to claim 1, wherein the characteristic is a form represented by the placement information, a length or an area size related to the form, or a material of the apparatus at the spot.

8. The storage medium according to claim 1, wherein the judging includes judging whether or not the characteristic matches the constraint condition corresponding to the three-dimensional model of the component to which the one certain record corresponds.

9. The storage medium according to claim 1, wherein the process further comprises:
performing a second selecting operation that
applies the judging to each record stored in the first database to judge whether or not the characteristic matches the constraint condition represented in the record and
narrows the first database down to only a record or records which is/are judged to be "matched";
performing a second menu update that extracts one or more values taken by each undetermined item for which more than one values remain selectable in the menu and which is one of the plural specification items, from the first database narrowed down by the second selecting operation; and
updating, for each undetermined item, one or more choices selectable by way of the menu according to the one or more values extracted by the second menu update.

10. The storage medium according to claim 9, wherein an updating of the menu by the first selecting operation and by the first menu update is carried out before or after an updating of the menu by the second selecting operation and by the second menu update.

11. The storage medium according to claim 1, wherein when no record whose constraint items are judged to match the characteristic exists in the first database, the process further comprises:
issuing a warning; and
canceling the placement information received in the receiving.

12. The storage medium according to claim 1, wherein when the first selecting operation results in that no record exists in the first database, the process further comprises:
issuing a warning; and
canceling the value that has been designated immediately before by way of the menu.

13. The storage medium according to claim 1, wherein a second database which is an external database including a record of each of the plural components is stored in a second storage unit accessible from the computer,
the plural specification items predetermined in accordance with the designated category are related to the identification information in the record of the second database, and
the first database is stored in a first storage unit accessible from the computer at a higher speed than a speed at which the second storage unit is accessed by the computer, wherein
the process further comprises reading content of the second database from the second storage unit; and
in the initializing, the content read from the second database is included into the first database.

14. The storage medium according to claim 1, wherein the menu is formatted to list a selectable one choice or more, or to examine, by receiving an input value, as to whether or not the input value is identical with the selectable choice.

15. A method executed by a computer, the method comprising:
designating, by a processor included in the computer, a category of a component whose three-dimensional model is to be selected from a library that stores three-dimensional models of plural components and that correlates each three-dimensional model with identification information of each component, wherein the category to be designated is one of a plurality of categories including a first category and a second category for use in combination with each other;
initializing, by the processor, a database by including records of components of the designated category into the database, wherein
each record included in the database stores the identification information, values of plural specification items, and values of plural constraint items,
each of the plural specification items represents a specification of the component,
each of the plural constraint items represents a constraint condition under which a three-dimensional model of the component is permitted to be placed,
the plural specification items and the plural constraint items are predetermined in accordance with the designated category,
the plural constraint items predetermined in accordance with the first category include a first item and a second item,
the first item of each individual record of each individual component of the first category represents, as the constraint condition for the individual component of the first category, a specification of a counterpart component of the second category permitted to be used in combination with the individual component of the first category, and
the second item of each individual record of each individual component of the first category represents the constraint condition that is other than the specification of the counterpart component of the second category;
displaying by the processor, in a screen of a three-dimensional computer aided design system that is implemented by the computer, a menu for designating a value of each of the plural specification items representing the specification of the component of the designated category;
performing, by the processor, a selecting operation of narrowing down the database according to one value designated for one item by way of the menu;
performing, by the processor, a menu update that
extracts, from the narrowed-down database, one or more values taken by each undetermined item for which more than one values remain selectable in the menu and which is one of the plural specification items, and
updates, for each undetermined item, one or more choices selectable by way of the menu according to the extracted one or more values;
receiving, by the processor, an input of placement information indicating a spot included in a three-dimensional model of an apparatus which is a design target of the three-dimensional computer aided design system;
obtaining by the processor, from the three-dimensional model of the apparatus, a characteristic of the spot indicated by the placement information;
judging, by the processor, whether or not the characteristic matches the constraint condition, wherein
when the designated category is the first category and the received placement information indicates, as the spot, a certain component whose three-dimensional model has already been placed and whose category is the second category, the judging is performed for each remaining record of a component of the designated first category remaining in the database, and a value of the first item of each remaining record is compared, in the judging, with a value indicating the characteristic to judge whether or not the characteristic matches the constraint condition represented by the first item, and when the designated category is the first category and the spot indicated by the received placement information is other than the certain component of the second category, the judging is performed for each remaining record of a component of the designated first category remaining in the database, and a value of the second item of each remaining record is compared, in the judging, with a value indicating the characteristic to judge whether or not the characteristic matches the constraint condition represented by the second item;

repeating, by the processor, the selecting operation and the menu update for one time or more until the narrowed-down database includes only one certain record for which the judging judges the characteristic matches the constraint condition;

loading, by the processor, the three-dimensional model of the component whose record is the one certain record from the library by designating the identification information; and placing, by the processor, the loaded three-dimensional model of the component on the spot indicated by the placement information.

16. A three-dimensional computer aided design system, comprising:

a category designation unit configured to designate a category of a component whose three-dimensional model is to be selected from a library that stores three-dimensional models of plural components and that correlates each three-dimensional model with each identification information of each component, wherein the category to be designated is one of a plurality of categories including a first category and a second category for use in combination with each other;

a menu display unit configured to display a menu for designating a value of each of plural specification items representing a specification of the component of the designated category, the plural specification items being predetermined in accordance with the designated category;

a storage unit configured to store a database including records of components of the designated category, where each record included in the database stores values of the plural specification items, values of plural constraint items, and the identification information, each of the plural constraint items represents a constraint condition under which a three-dimensional model of the component is permitted to be placed, the plural constraint items are predetermined in accordance with the designated category, the plural constraint items predetermined in accordance with the first category include a first item and a second item, the first item of each individual record of each individual component of the first category represents, as the constraint condition for the individual component of the first category, a specification of a counterpart component of the second category permitted to be used in combination with the individual component of the first category, and the second item of each individual record of each individual component of the first category represents the constraint condition that is other than the specification of the counterpart component of the second category;

a selection unit configured to initialize the database by including the records of the components of the designated category into the database, and to narrow down the database according to one value designated for one item by way of the menu;

a menu update unit configured to extract, from the narrowed-down database, one or more values taken by each undetermined item for which more than one values remain selectable in the menu and which is one of the plural specification items, and to update, for each undetermined item, one or more choices selectable by way of the menu according to the extracted one or more values;

a receiving unit configured to receive an input of placement information indicating a spot included in a three-dimensional model of an apparatus which is a design target of the three-dimensional computer aided design system;

an obtaining unit configured to obtain, from the three-dimensional model of the apparatus, a characteristic of the spot indicated by the placement information;

a judgment unit configured to judge whether or not the characteristic matches the constraint condition, wherein when the designated category is the first category and the received placement information indicates, as the spot, a certain component whose three-dimensional model has already been placed and whose category is the second category, the judgment unit judges whether the characteristic matches the constraint condition or not for each remaining record of a component of the designated first category remaining in the database, by comparing a value of the first item of each remaining record with a value indicating the characteristic to judge whether or not the characteristic matches the constraint condition represented by the first item, and when the designated category is the first category and the spot indicated by the received placement information is other than the certain component of the second category, the judgment unit judges whether the characteristic matches the constraint condition or not for each remaining record of a component of the designated first category remaining in the database, by comparing a value of the second item of each remaining record with a value indicating the characteristic to judge whether or not the characteristic matches the constraint condition represented by the second item;

a determination unit configured to determine whether the database is narrowed down to include only one certain record, for which the judgment unit judges the characteristic matches the constraint condition, by repeating narrowing-down by the selection unit and updating by the menu update unit for one time or more;

a load unit configured to load the three-dimensional model of the component whose record is the one certain record from the library by designating the identification information; and a placement unit configured to place the loaded three-dimensional model of the component on the spot indicated by the placement information.

17. The storage medium according to claim 1, wherein
the constraint condition with respect to the second category is represented by each of the plural constraint items which are predetermined in accordance with the second category and which include a third item and a fourth item,
the third item of each individual record of each individual component of the second category represents, as the constraint condition for the individual component of the second category, a specification of a counterpart component of the first category permitted to be used in combination with the individual component of the second category and
the fourth item of each individual record of each individual component of the second category represents the constraint condition that is other than the specification of the counterpart component of the first category, and
under a case in which the second category is designated in the designating,
  when the received placement information indicates, as the spot, a certain component whose three-dimensional model has already been placed and which is of the first category, the third item is used in the judging as an item representing the constraint condition, and
  otherwise, the fourth item is used in the judging as an item representing the constraint condition.

* * * * *